(12) United States Patent
Jao et al.

(10) Patent No.: US 9,817,640 B2
(45) Date of Patent: Nov. 14, 2017

(54) SYSTEM, METHOD AND PLATFORM OF ESTABLISHING APPLICATION PROGRAM HAVING CAPABILITY OF DYNAMICALLY LINKING EXTERNAL DYNAMIC LINK FUNCTION

(71) Applicant: EverMore Technology Inc., Hsinchu (TW)

(72) Inventors: Jui-Chi Jao, Hsinchu (TW); Yuan-Sheng Chen, Hsinchu (TW); Wu-Hsiung Huang, Hsinchu (TW); Tsu-Pin Weng, Hsinchu (TW); Jia-You Jiang, Hsinchu (TW)

(73) Assignee: EverMore Technology Inc., Hsinchu (TW)

( * ) Notice: Subject to any disclaimer, the term of this patent is extended or adjusted under 35 U.S.C. 154(b) by 0 days.

(21) Appl. No.: 15/006,389

(22) Filed: Jan. 26, 2016

(65) Prior Publication Data
US 2017/0083293 A1 Mar. 23, 2017

(30) Foreign Application Priority Data
Sep. 17, 2015 (TW) .................. 104130848

(51) Int. Cl.
*G06F 9/44* (2006.01)
*H04L 29/08* (2006.01)
(Continued)

(52) U.S. Cl.
CPC .............. *G06F 8/34* (2013.01); *G06F 3/0481* (2013.01); *G06F 8/61* (2013.01); *G06F 9/445* (2013.01);
(Continued)

(58) Field of Classification Search
CPC .......... G06F 8/30–8/54; G06F 9/445–9/44594
See application file for complete search history.

(56) References Cited

U.S. PATENT DOCUMENTS 8,341,595 B2 * 12/2012 Arner .................. G06F 8/38
717/104
8,813,028 B2 * 8/2014 Farooqi .................. G06F 8/36
717/107
(Continued)

OTHER PUBLICATIONS

Franz, Michael, "Dynamic Linking of Software Components," 1997, pp. 74-81.*
(Continued)

*Primary Examiner* — Thuy Dao
*Assistant Examiner* — Christopher Franco
(74) *Attorney, Agent, or Firm* — Muncy, Geissler, Olds & Lowe, P.C.

(57) ABSTRACT

The present invention relates to a platform of establishing an application program for a mobile device providing a user to autonomously establish the application program having a capability of dynamically calling and loading a dynamic link function (DLF) library during execution. The platform includes a user interface shown by an internet browser; and a DLF module shown by the user interface and configured to provide the user to set in the application program a call and a linkage to the DLF library during the establishing process, wherein a user accesses to the platform to operate the DLF module to establish the application program through operating on the internet browser showing the user interface.

8 Claims, 27 Drawing Sheets

(51) Int. Cl.
    *G06F 3/0481*   (2013.01)
    *G06F 9/445*    (2006.01)
    *G06F 9/45*     (2006.01)

(52) U.S. Cl.
    CPC .......... *G06F 9/44521* (2013.01); *H04L 67/02* (2013.01); *G06F 8/41* (2013.01); *G06F 8/67* (2013.01)

(56) References Cited

U.S. PATENT DOCUMENTS

| | | | | |
|---|---|---|---|---|
| 8,832,644 B2* | 9/2014 | Hirsch | ....................... | G06F 8/71 717/107 |
| 2006/0026305 A1* | 2/2006 | Illowsky | ................... | G06F 8/61 710/8 |
| 2009/0013310 A1* | 1/2009 | Arner | ....................... | G06F 8/38 717/120 |
| 2013/0205276 A1* | 8/2013 | Hirsch | ....................... | G06F 8/71 717/105 |
| 2014/0026113 A1* | 1/2014 | Farooqi | ..................... | G06F 8/34 717/107 |
| 2014/0282398 A1* | 9/2014 | Podolyak | .................. | G06F 8/71 717/121 |

OTHER PUBLICATIONS

Batista, Thais et al., "Dynamic Reconfiguration of Component-based Applications," 2000, pp. 1-8.*

Benson, Theophilus et al., "CloudNaaS: A Cloud Networking Platform for Enterprise Applications," 2011, pp. 1-13.*

Capilla, Rafael et al., "An Enhanced Architectural Knowledge Metamodel Linking Architectural Design Decisions to other Artifacts in the Software Engineering Lifecycle," 2011, pp. 303-311.*

Fong, Philip W.L. et al., "Proof Linking: Modular Verification of Mobile Programs in the Presence of Lazy, Dynamic Linking," 2000, pp. 379-409.*

Hemalatha, T. et al., "Dynamic Web Service Based Image Processing System," 2008, pp. 323-328.*

* cited by examiner

SYSTEM, METHOD AND PLATFORM OF ESTABLISHING APPLICATION PROGRAM HAVING CAPABILITY OF DYNAMICALLY LINKING EXTERNAL DYNAMIC LINK FUNCTION

FIELD

The present invention relates to an application program establishing system, method and platform, in particular to an application program establishing system, method and platform which allows any user to autonomously establish an application program having a capability of dynamically linking, calling and loading a dynamic link function (DLF) library during execution.

BACKGROUND

For recent years, with the prosperous developments of mobile technologies, various mobile devices, such as a smart phone, a tablet computer, a phablet, a wearable device and the like, are rapidly improved and widely popularized. Every mobile device requires a specific operating system (OS) to drive, to coordinate and to manage multiple basic operations in the mobile device. Currently, the application programming interface (API), consisting of a series of instructions and source codes used for communicating with the specific OS, are opened to the public, including general users, ordinary consumers or technical persons. So people are free to use the instructions and codes provided in API, to program or to compile various application programs (Apps), such as a mobile game App, a finical App, a LBS service App, a communication App, a GPS-based App and so on, executable on the mobile device.

However, as known to the public, developing an App capable of running on the currently most popular Android smart phone is never to be an easy thing to do after all. A developer must get started from very initial stage and has to learn some knowledge like the Android SDK developing platform, the Eclipse developing environment, the Web related technologies, and the Java syntax etc., in order to well use the API to design and develop a good App. Usually the developer must be a senior professional programmer. Thus, even though an ordinary user comes up with a good idea, it is never easy to turn it into a real App operable and executable a mobile device for the ordinary user.

This is to say, in order to program an App running on the mobile device, the developer must have quite professional capability and foundation regarding programming. For a minimum requirement, the developer shall understand the Html language, Java language, Android system and iOS system at least. Except the good programming capability, developing a successful application program further requires the very attractive digital contents. Therefore, to accomplish an application program is actually a laboring demanding task and also requires massive designs and plans. An ordinary user or consumer can never have an opportunity to develop one's own application program to run on a mobile device.

Hence, there needs a very convenience and simplified way to establish an application program. Especially there is a need to provide an ease way by which every ordinary user and general consumer can simply and easily establish one's own application program, in particular to establish an App having a capability of dynamically linking, calling and loading a dynamic link function (DLF) library during the execution, which means the App can link, call and load an external DLF library when the App is executing.

There is a need to solve the above deficiencies/issues.

SUMMARY

The present invention provides a system of establishing an application program for a mobile device by providing a user to autonomously establish the application program, which has a capability of dynamically calling and loading a dynamic link function (DLF) library during execution, through operating on an internet browser showing a user interface provided by an application program establishing platform. The system includes a server in a remote end and installed with the platform, which platform comprises a DLF module shown by the user interface and configured to provide the user to set in the application program a call and a loader associated to the DLF library during the establishing process; and a personal computer in a local end, connected with the server through an Internet and installed with the internet browser, wherein the user accesses to the platform to operate the DLF module to establish the application program through operating on the internet browser showing the user interface.

The present invention further provides a method of establishing an application program for a mobile device by providing a user to autonomously establish the application program, which has a capability of dynamically calling and loading a dynamic link function (DLF) library during execution, through operating on an internet browser showing a user interface provided by an application program establishing platform. The method includes in a remote end providing the platform comprising a DLF module shown by the user interface and configured to provide the user to set in the application program a linkage and a loader to the DLF library during the establishing process; and in a local end accessing to the platform to operate the DLF module to establish the application program through operating on the internet browser showing the user interface.

The method further includes one of the following steps: providing the platform by a platform provider; providing the DLF module by a DLF provider; by the platform provider creating and providing a DLF project comprising a program file and a first data file to the DLF provider, wherein the program file comprises a basic code frame having a basic code segment for communicating with the platform and the first data file comprises parameters, data and files called and employed by the basic code frame during execution; by the DLF provider receiving the DLF project, programming a core code segment for performing a function for the DLF library, and saving the parameters, data and files called and employed by the core code segment into the first data file; by the DLF provider operating the platform by operating on the internet browser showing the user interface to create the DLF module on the platform by following with a guidance from the platform and uploading the program file and the first data file to the DLF module by following with the guidance; by the user operating the DLF module on the platform by operating on the internet browser showing the user interface to set the linkage and the loader to the DLF library in the application program to establish the application program by following with the guidance; and by the platform provider compiling and packing the established application program into an executive program executable on the mobile device.

The present invention further provides a platform of establishing an application program for a mobile device providing a user to autonomously establish the application program having a capability of dynamically calling and loading a dynamic link function (DLF) library during execution. The platform includes a user interface shown by an internet browser; and a DLF module shown by the user interface and configured to provide the user to set in the application program a call and a linkage to the DLF library during the establishing process, wherein a user accesses to the platform to operate the DLF module to establish the application program through operating on the internet browser showing the user interface.

DESCRIPTION OF THE DRAWINGS

A more complete appreciation of the invention and many of the attendant advantages thereof are readily obtained as the same become better understood by reference to the following detailed description when considered in connection with the accompanying drawing, wherein:

FIG. 11 shows a schematic diagram illustrating a DLF instruction setting page provided by the DLF App establishing platform in accordance with the present invention.

FIG. 14 shows a schematic diagram illustrating a DLF newly added instruction setting page provided by the DLF App establishing platform in accordance with the present invention.

DETAILED DESCRIPTION

Figure 1:
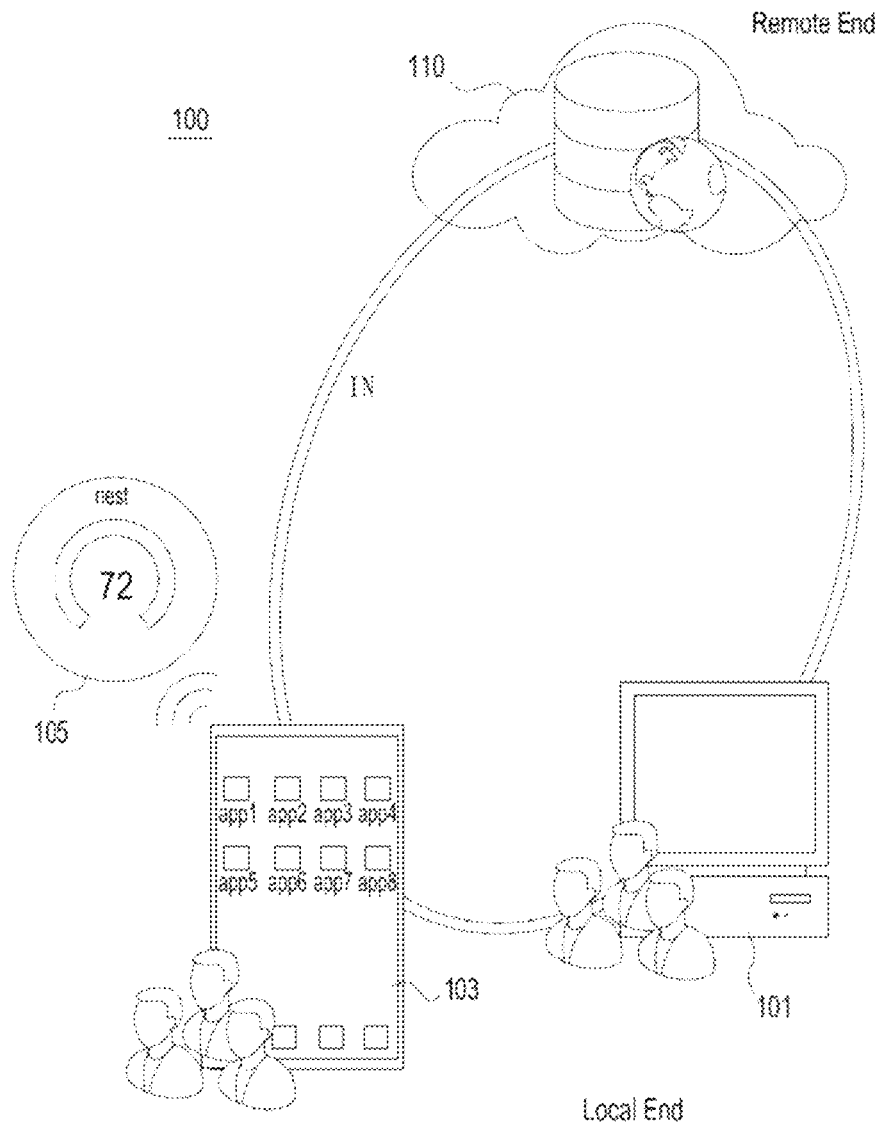
FIG. 1 is a schematic diagram illustrating an essential architecture for the application program establishing system in accordance with the present invention.

The present disclosure will be described with respect to particular embodiments and with reference to certain drawings, but the disclosure is not limited thereto but is only limited by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice.

It is to be noticed that the term "including", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device including means A and B" should not be limited to devices consisting only of components A and B.

The disclosure will now be described by a detailed description of several embodiments. It is clear that other embodiments can be configured according to the knowledge of persons skilled in the art without departing from the true technical teaching of the present disclosure, the claimed disclosure being limited only by the terms of the appended claims.

The personal computer described in the present disclosure is preferably, a desktop computer, a notebook computer or a tablet computer. The mobile device described in the present disclosure is preferably a smart phone, a tablet computer, a phablet (a.k.a. a tablet phone) or a wearable device. The internet described in the present disclosure is preferably a cable network, a wireless network, a cloud network, a local area network (LAN) or a wide area network (WAN), a GSM network, a 3G network, a 4G network or a Wi-Fi network. The application program described in the present disclosure is hereinafter referred to as App for short, which App is a program implementable and executable on the aforementioned mobile device. For the sake of describing the present invention simply and definitely, the aforementioned personal computer is to be exemplarily described with respect to but not limited to a desktop computer and the aforementioned mobile device is to be exemplarily described with respect to but not limited to a smart phone.

It is to be noticed that the present disclosure includes contents in Taiwan patent application number 100126878 entitled as "METHOD OF PROVIDING CONTENTS FOR MOBILE COMPUTING DEVICE" filed on Jul. 28, 2011, contents in Taiwan patent application number 101115678 entitled as "SYSTEM AND METHOD OF ESTABLISHING APPLICATION PROGRAM FOR MOBILE COMPUTING DEVICE" filed on May 2, 2012 and contents in Taiwan patent application number 101123945 entitled as "ESTABLISHING SYSTEM AND METHOD FOR ESTABLISHING APPLICATION PROGRAM FOR MOBILE COMPUTING DEVICE AND HAVING CAPABILITY CONTROLLING INPUT AND OUTPUT INTERFACE" filed on Jul. 3, 2012 and contents in Taiwan patent application number 102118126 entitled as "ESTABLISHING PLATFORM FOR IF-THIS-THAN-THAT RULE BASED APPLICATION PROGRAM USED IN MOBILE COMMUNICATION DEVICE" filed on May 22, 2013, which above-identified applications have the Applicants the same as the present invention does and are incorporated into this application by reference as if fully set forth herein.

FIG. 1 is a schematic diagram illustrating an essential architecture for the application program establishing system in accordance with the present invention. The establishing system 100 as shown in FIG. 1 includes a personal computer 101 disposed in a local end, a mobile device 103, an external device 105 and a server 110 disposed in a remote end, in which the personal computer 101, mobile device 103 and the server 110 are electrically connected with each other through an internet IN to communicate with each other and to exchange data and information with each other. The personal computer 101 is preferably a desktop computer, a notebook computer or a tablet computer. The mobile device 103 is preferably a smart phone, a tablet computer or a phablet (a.k.a. a tablet phone). The internet IN consists of multiple networks selected from a cable network, a wireless network, a cloud network, a local area network (LAN) or a wide area network (WAN) and a combination thereof. The mobile device 103 can communicate with the external device 105, such as a NEST thermostat, by a wireless communication module, such as a Wi-Fi wireless communication module or a Bluetooth communication module.

An application program (termed as App for short) establishing platform 112 is installed on the server 110. The App establishing platform 112 is an App generator which is operated based on the PaaS technology and is managed and maintained by the platform provider. The App establishing platform 112 is able to provide multiple basic App modes and templates and to open most parts of the contents of the App to the ordinary users for self-establishment, so that an ordinary user without professional IT skill can establish, build and create one's own App based on personal demands easily and quickly. More technologies regarding the App establishing platform 112 was disclosed in the previously cited multiple patents, which are incorporated into this application by reference as if fully set forth herein.

To sum up, the App establishing platform 112 installed in the server 110 is capable of providing multiple templates and function modules to an ordinary user or an App developer. An ordinary user first uses an internet browser installed in the personal computer 107 to connect to the internet IN and then one can access and operate the App establishing platform 112 on the server 110 through the internet browser. A user interface in the App establishing platform 112 massively utilizes a pull-down menu, a hierarch-based menu and a click-based menu, etc. to guide an ordinary user, so any ordinary user can easily perform various operations by simply following the menus and the instructions can autonomously create and build one's own contents of App. When the ordinary user accomplishes the establishment of App, the App establishing platform 112 automatically compiles the entire built App as an executable file for a mobile device. For example, for an Android system, the App establishing platform 112 automatically generates an executable file having an extension filename as .apk, which is executable under a mobile device installed with an Android operating system. Then the platform provider uploads this App to the Android market, such as, Google play market. Any user can download this App from the Google play market and installs it on one's own mobile device, such as a smart phone.

In this information technology (IT) age, regardless of a software provider or a hardware manufacturer, there are already numerous driving or control programs developed for their own software and hardware products. However, with the coming of the internet of things (IoT) age, in the future time, sooner or later the following scenario comes true that multiple devices are interconnected with each other and a single mobile device may link to numerous external devices, and perform communication, synchronization, connection and control operations, etc. simultaneously with these numerous external devices. Thus for these numerous external devices, they need to call and load the corresponding driving or control program with respect to the single mobile device during the performance process dynamically and frequently.

It is a feasible way to share and open the driving or control program corresponding to the single mobile device and to make it available to the public, if the corresponding software provider or a hardware manufacturer hopes the mobile device can be widely accepted and easily called, loaded and employed by the numerous external devices. A dynamic-link function (DLF) concept, which is a technology similar with and originated from Microsoft's dynamic-link library (DLL)

which is a shared library concept, is herein proposed and introduced. Every provider or manufacturer edits and compiles its own driving or control program into a specific DLF file format that is accepted by every DLF-implemented device and releases it with relevant specifications and parameters to the public, so that numerous DLF-implemented devices can link with each other by simply calling and loading the corresponding DLF, vice versa, a single mobile device can link with other numerous mobile devices by simply calling and loading the corresponding DLF.

It is apparent that the DLF concept has multiple advantages including code sharing, code reusing, modular programming, enhancing the efficiency for memory using, reducing disk consuming space, improving overall efficient and speed of operating system, easy to update and maintain code, etc. If the providers or the manufacturers share and open these driving and control program in the DLF format to the public including an App developer, the App developer can concatenate the needed DLF module in the App, and then the App can call, load, concatenate and use these DLF module during performance. Hence, in this IoT age, it is necessary to develop and integrate a function module regarding the DLF technology into the App establishing platform.

There are three parties involved in the above-mentioned operations as follows: a platform service provider who provides the App establishing platform (termed as a platform provider for short), a DLF contents provider who provides the DLF module and uploads it onto the platform and can be a manufacturer to the DLF related software or hardware (termed as a DLF provider for short), and an App developer who builds and develops the App. The App establishing process includes two major stages which are a provider establishment stage and a developer establishment stage, wherein the provider establishment stage further includes two major phases which are a provider project phase and a provider platform phase.

In the provider establishing stage, the provider project phase is first entered, and an Android system is taken as an example. The platform provider opens a DLF project including a CmoreDlfTestInstance.java file and a CmoreDLF.jar file. The CmoreDlfTestInstance.java file is not a complete executable program file, and it contains only a basic code frame for running under a Java environment, which basic code frame contains, for example, a code segment of class definition or a necessary code segment for communicating with the platform. That is in this phase, CmoreDlfTestInstance.java file includes a piece of a basic code segment which was written and programmed by the platform provider. The CmoreDLF.jar file contains parameters, data and files discloseable to the public and called by the CmoreDlfTestInstance.java file during execution. Then the platform provider provides the DLF project to the DLF provider.

After the DLF provider receives the DLF project, the DLF provider programs codes of the DLF library based on Java language as a core code segment performing the dynamic-link function, and the DLF provider combines it into the CmoreDlfTestInstance.java file. The parameters, data and files called and employed by the CmoreDlfTestInstance.java file is saved into the CmoreDLF.jar file. Under certain conditions, if the DLF library is associated with a commercial secret or a technology known-how for example, the DLF provider may not be willing to disclose the parameters, data and files to the public. The DLF provider can additionally create another CmoreDNA.jar file for containing information non-disclosure or unpublishable, if necessary.

When the DLF provider accomplishes the above-mentioned building for the program file and data file, the DLF provider get started to operate the front-office application for the App establishing platform to create a new DLF module on the platform. The DLF follows a guidance from the platform to upload every program file and data files, for example, CmoreDlfTestInstance.java, CmoreDLF.jar and CmoreDNA.jar (if available) onto the platform. Then the DLF provider can optionally opens these files to the App developer. the App developer can operate the internet browser to set up a linkage, a call, a loader to the DLF library in the App, to establish the App to have a capability of dynamically linking, calling and loading a dynamic link function (DLF) library during execution.

Figure 2:
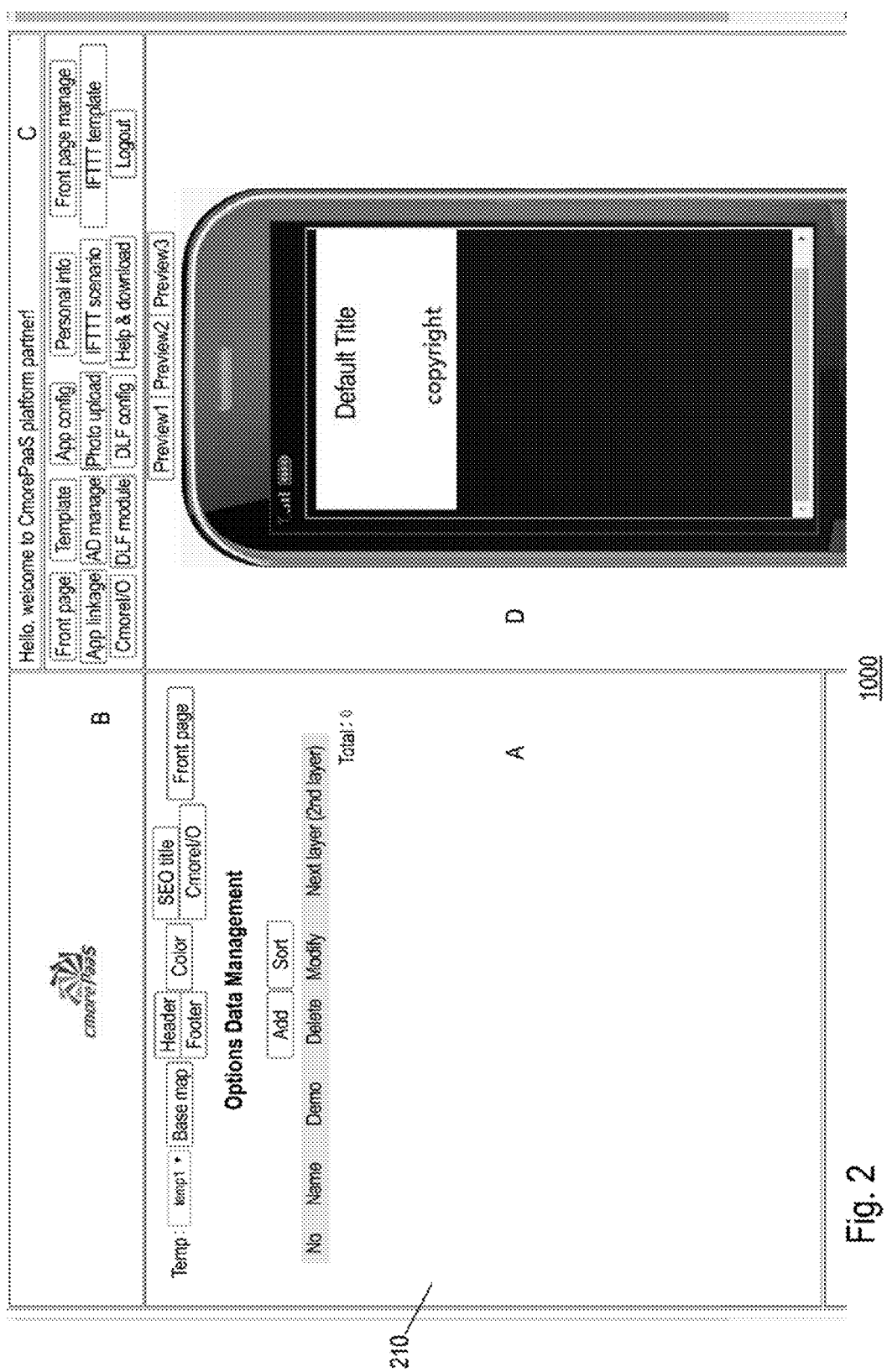
FIG. 2 shows a schematic diagram illustrating a main user interface provided by the DLF App establishing platform in accordance with the present invention.

FIG. 2 shows a schematic diagram illustrating the main user interface provided by the DLF App establishing platform in accordance with the present invention. The main user interface (UI) in FIG. 2 includes four major sections, the working section A, the working section B, the option section C, the simulation section D. As shown in FIG. 2, the option section C is used for listing and showing all the function modules provided by the establishing platform and available to a user to enter to set up. While a user select a specific function module, the contents in the selected function module is shown in working section A and working section B. A user can perform relevant editions and setup through operating the working section A and the working section B. In an initial status, the top layer in the working section A includes an option management page 210 which also acts as a front page for the working section A, and the top layer in the working section B is used for showing a mark icon, a trademark icon, an advertisement icon or a publication date. The simulation area D is used for simulating and showing the corresponding screen outcome on a smart phone set up through operating the working section A and working section B by a user.

Figure 3:
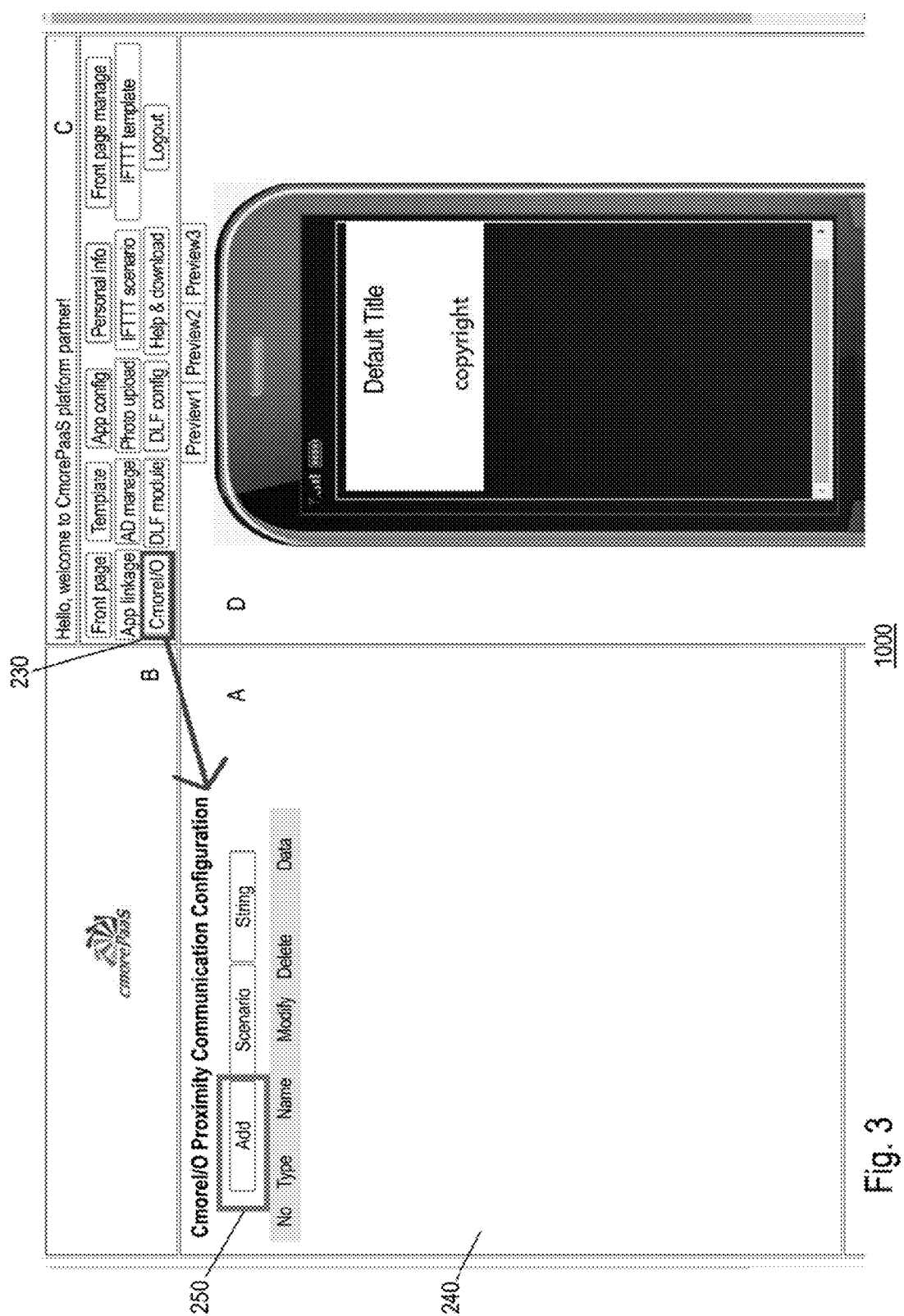
FIG. 3 shows a schematic diagram illustrating a CmoreIO proximity communication configuration page provided by the DLF App establishing platform in accordance with the present invention.
Figure 4:
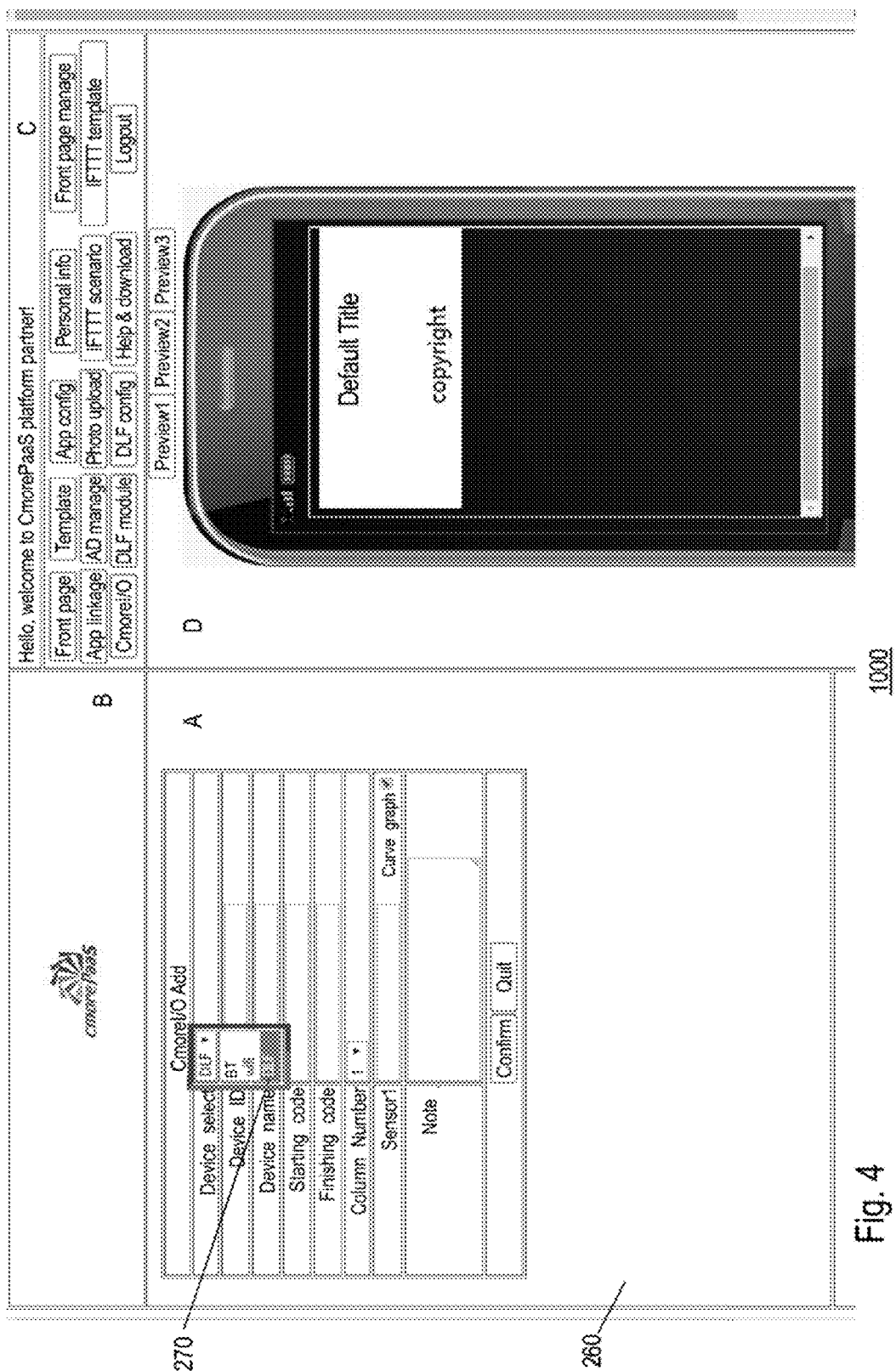
FIG. 4 shows a schematic diagram illustrating a CmoreIO newly add-on setting page provided by the DLF App establishing platform in accordance with the present invention.

Before using and entering the DLF module, a user has to accomplish a setup for an input and output (I/O) physical interface between the mobile device 103 and the external device 105, which is the communication interface between the DLF module and the mobile device. As shown in FIG. 3, a user clicks the CmoreIO button 230 shown on the bottom left in the option section C to enter the CmoreIO module to set up the I/O physical interface. The CmoreIO module is used for setting the I/O physical interface. After clicking, the working section A shows a CmoreIO proximity communication configuration page 240. Then a user clicks the newly add-on button 250 shown in the setting page 240, to newly add a proximity communication item. After clicking, as shown in FIG. 4, the newly add-on setting page 260 is shown in working section. Then a user selects a DLF item 270 shown in the pull-down menu for device selection shown in the setting page 260.

Figure 5A:
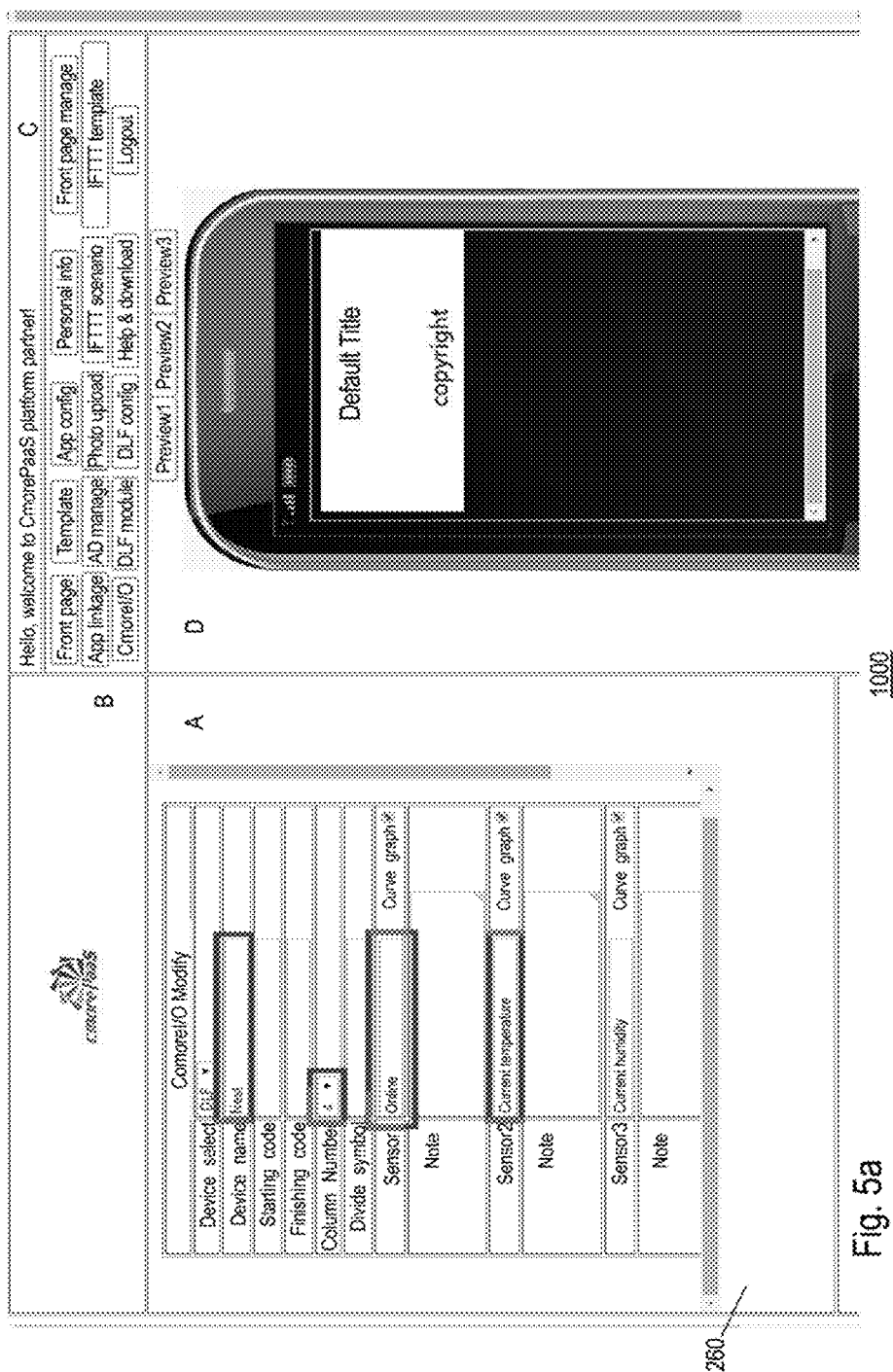
FIG. 5a shows a schematic diagram illustrating a CmoreIO newly add-on setting page provided by the DLF App establishing platform in accordance with the present invention.
Figure 5B:
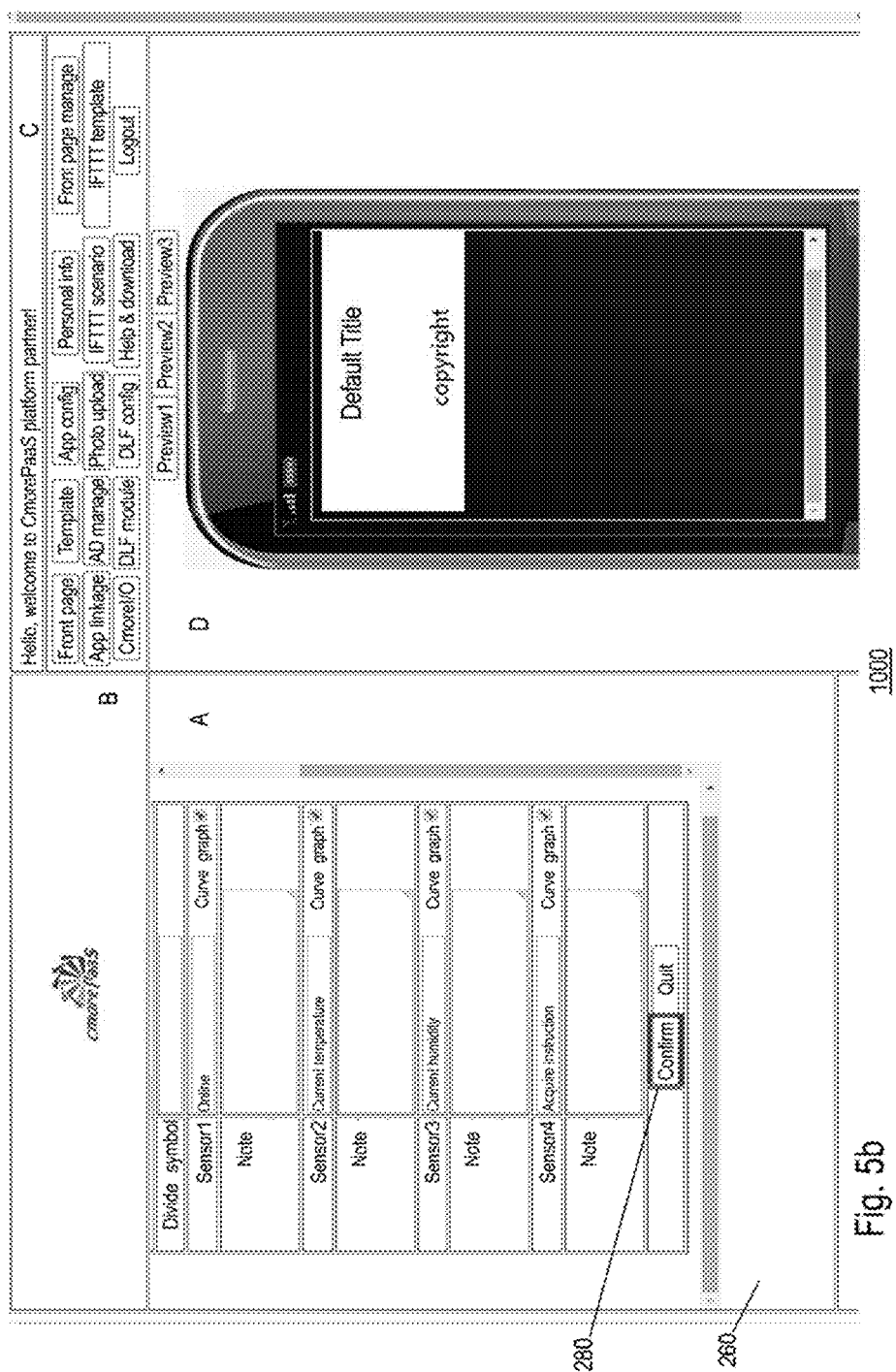
FIG. 5b shows a schematic diagram illustrating a CmoreIO newly add-on setting page provided by the DLF App establishing platform in accordance with the present invention.
Figure 6:
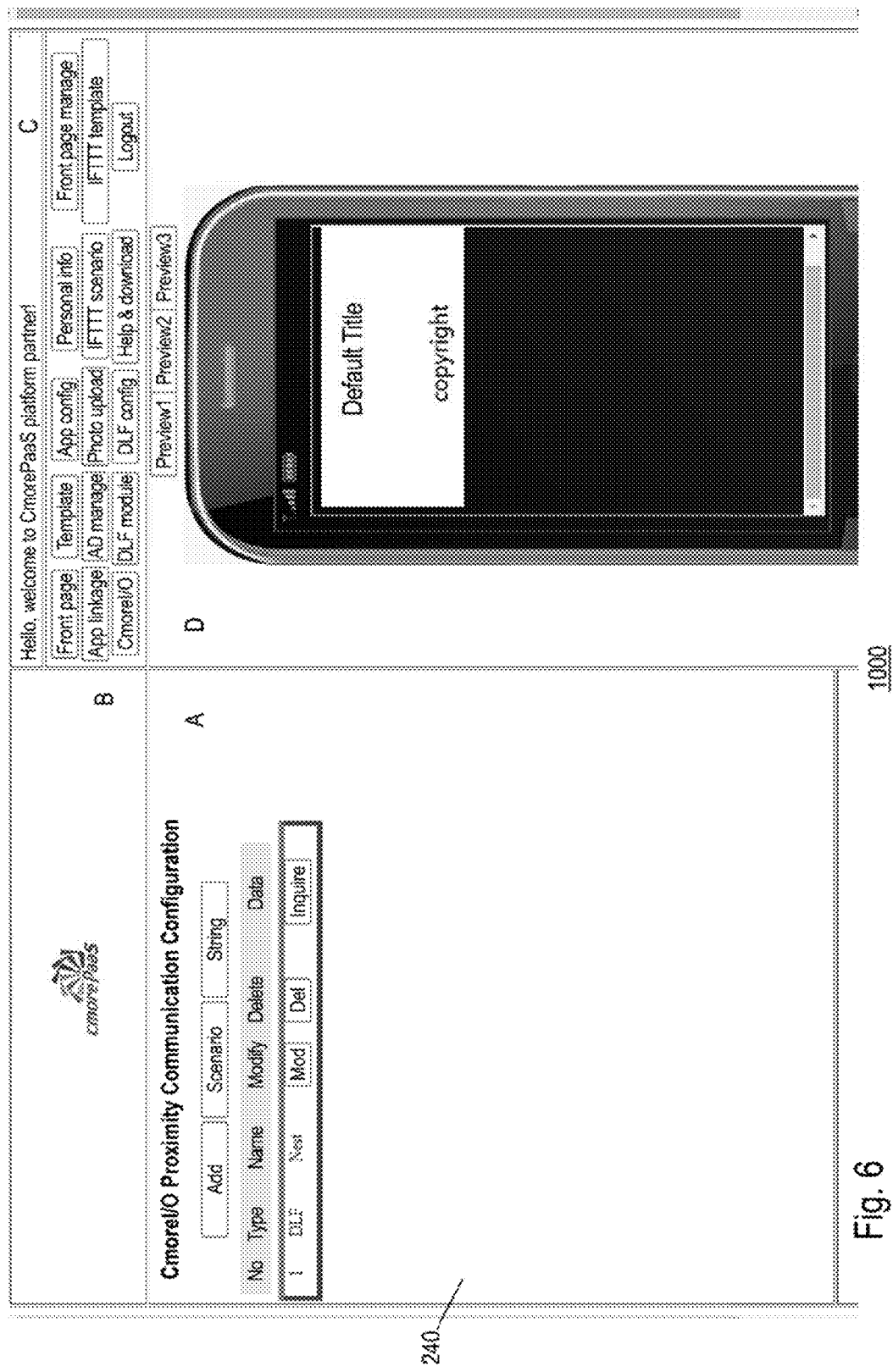
FIG. 6 shows a schematic diagram illustrating a CmoreIO proximity communication configuration page provided by the DLF App establishing platform in accordance with the present invention.

As shown in FIGS. 5a and 5b, a series of device parameters relevant to a NEST thermostat device is shown in setting page 260. In this embodiment, since the NEST thermostat has four independent sensors, there are at least four kinds of parameters shown on setting page 260, including the online status, the current temperature, the current humidity, the acquired instruction, etc. When a user accomplishes the setup to the aforementioned parameters, the user clicks a confirmed button 280 shown at the bottom of the setting page 260. As shown in FIG. 6, after clicking, the content shown in working section A is switched back to the CmoreIO proximity communication configuration page 240, and the newly added DLF-based type communication is listed and shown on the setting page 240.

Figure 7:
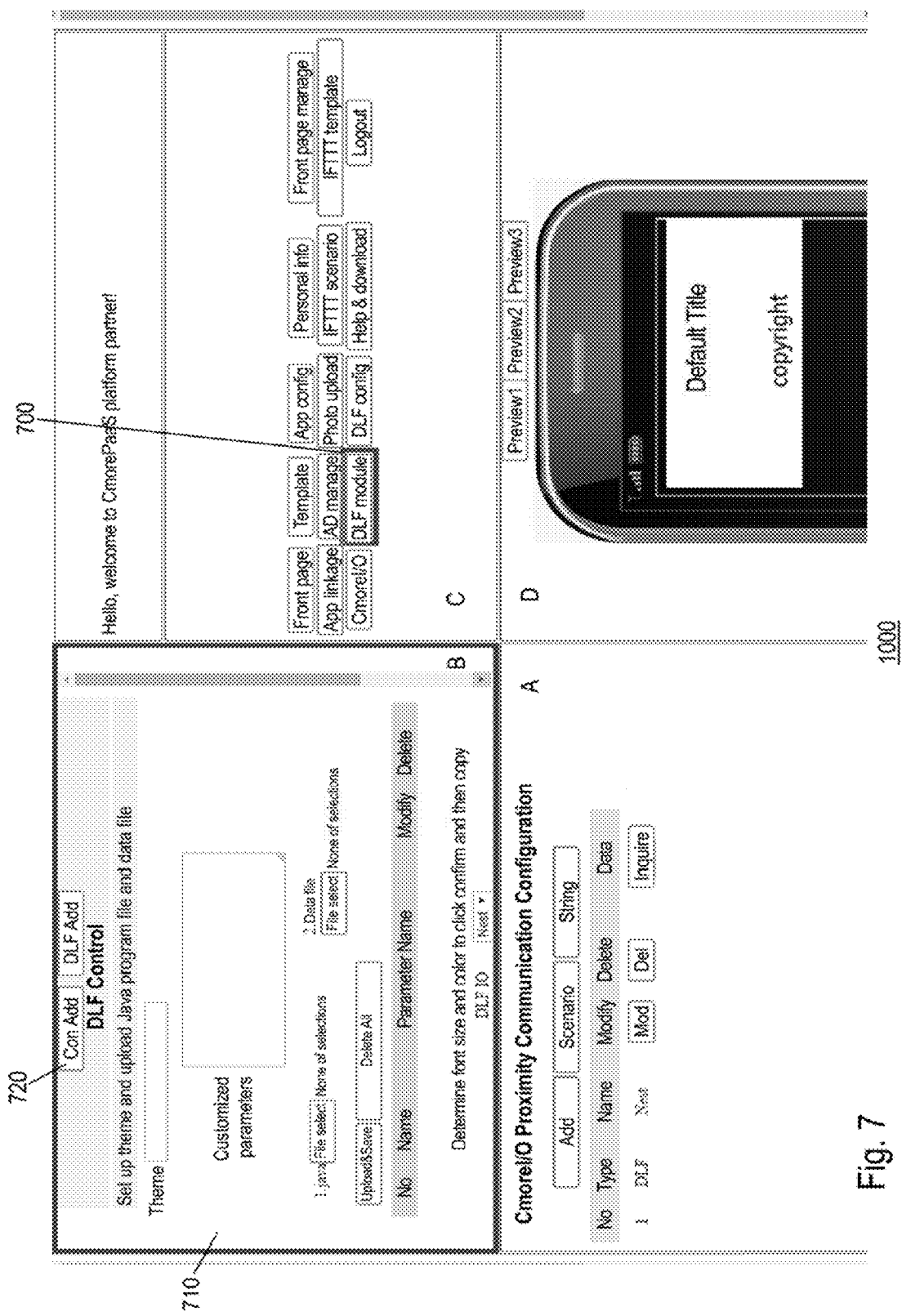
FIG. 7 shows a schematic diagram illustrating a DLF instruction setting page provided by the DLF App establishing platform in accordance with the present invention.
Figure 8:
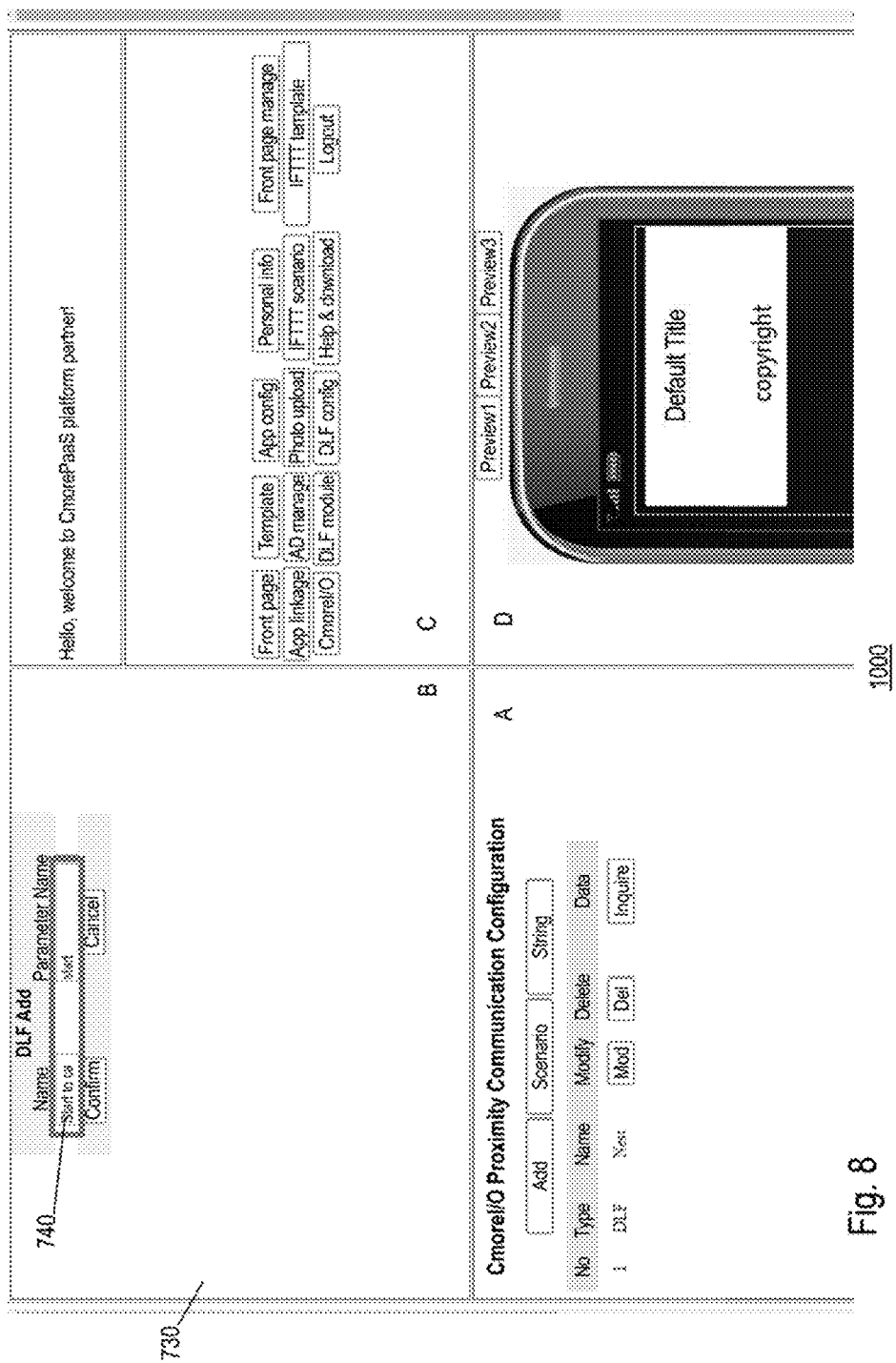
FIG. 8 shows a schematic diagram illustrating a DLF newly added instruction setting page provided by the DLF App establishing platform in accordance with the present invention.

After finishing the setup to the input and output (I/O) physical interface, a user has to define a collection of instructions for the DLF module. As shown in FIG. 7, a user clicks a DLF building button 700 shown at bottom left in the option section C. After clicking, an instruction setting page 710 is correspondingly shown in working section B for providing the user to edit the collection of instructions. A user selects to click an instru add-on button 720 in the setting page 710. As shown in FIG. 8, a series of setting menu for setting instructions is activated on the App establishing platform. A newly added instruction setting page 730 is shown in the editing area B. A user can define an association relationship between an instruction name and an actual control parameter by the setting page 730 to actually build a new instruction. An instruction name user wants to show is inputted into the field of name in FIG. 8. The instruction name acting as an example to be inputted into the name field in this embodiment is "capture". An actual control parameter corresponding to the instruction name "capture" and inputted into the field of parameter is "start". A user clicks the confirmed button 740, once the aforementioned setup process is accomplished.

Figure 9:
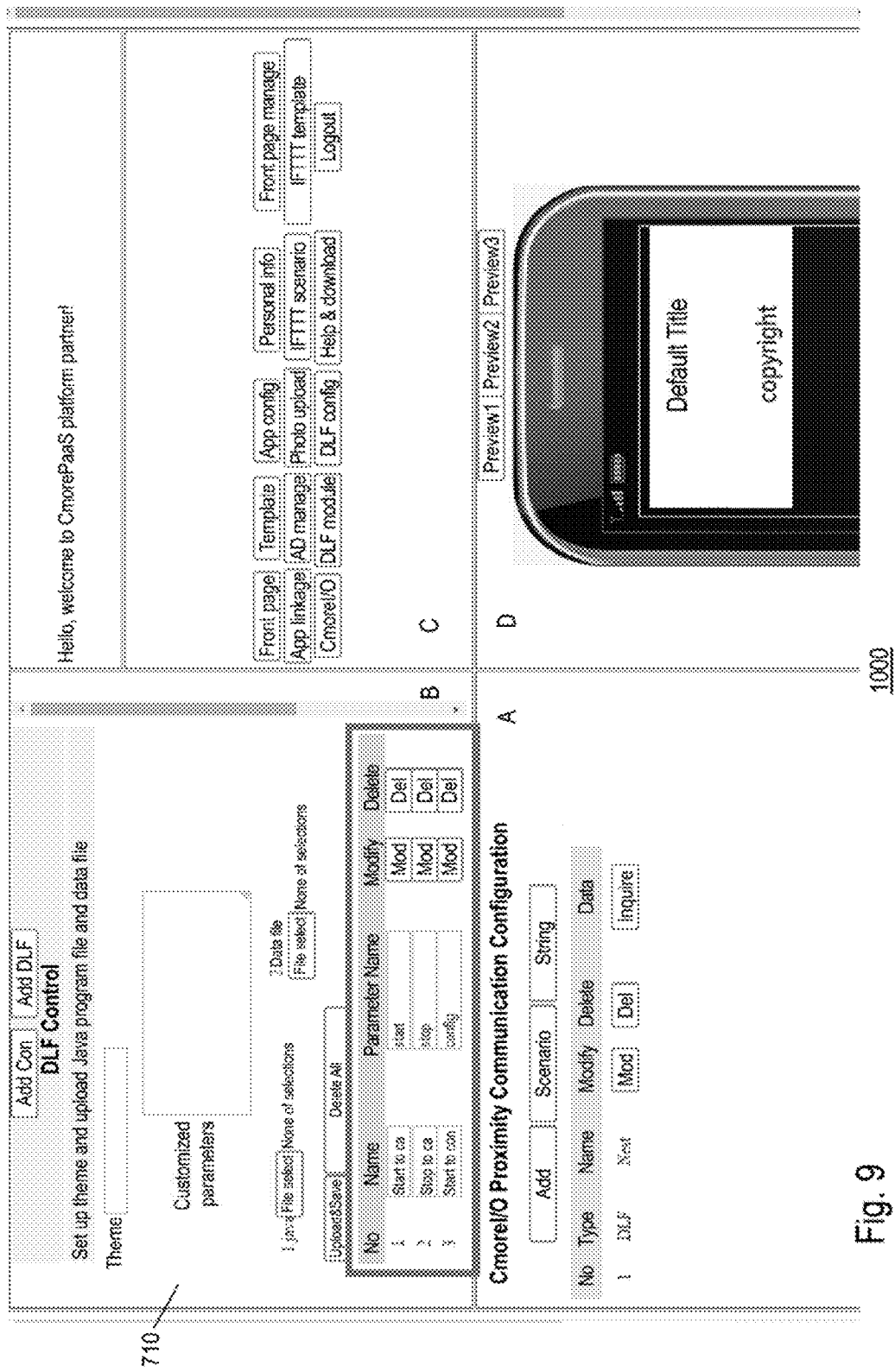
FIG. 9 shows a schematic diagram illustrating a DLF instruction setting page provided by the DLF App establishing platform in accordance with the present invention.

As shown in FIG. 9, after clicking, the content shown in working section B is switched back to the instruction setting page 710. Then a user clicks the instru add-on button 720 in the instruction setting page 710, to enter the newly added instruction setting page 730. A user consistently repeats the aforementioned loop to add a series of control instruction. As shown in FIG. 9, there are totally three control instruction is added and set, which are [getting started to capture; start], [cease capturing; stop] and [open the configuration window; config] respectively.

Figure 10:
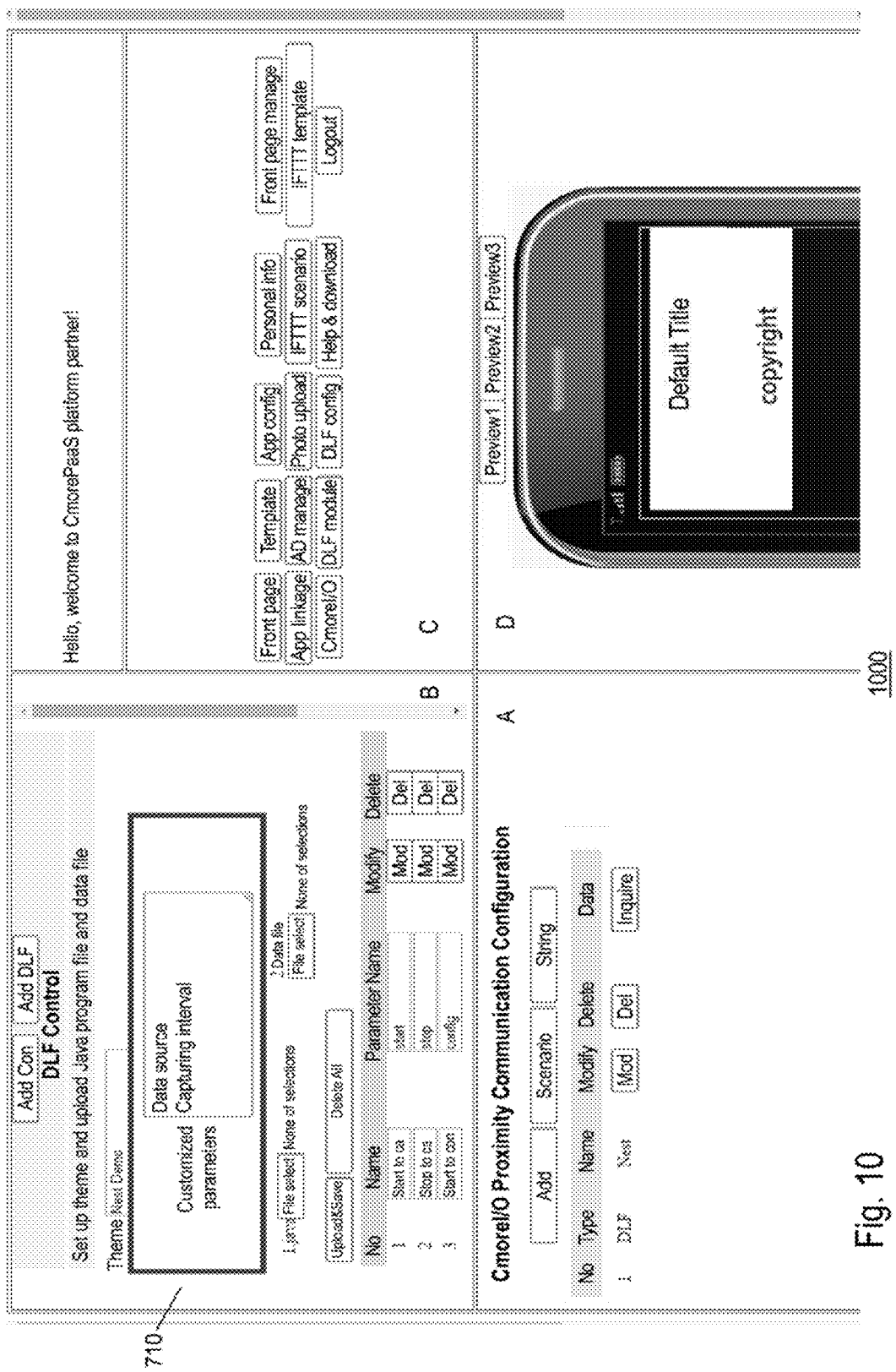
FIG. 10 shows a schematic diagram illustrating a DLF instruction setting page provided by the DLF App establishing platform in accordance with the present invention.

For the convenience of the use of the DLF module, and to render a user be able to flexibly configure a certain of special function, such as, a communication IP address, a communication frequency, an output format, etc., as shown in FIG. 10, a customized para field 750 is included in the instruction setting page 710. A user is allowed to flexibly define certain special parameters by one's own willing, to input the user-defined parameters into field 750. After that, the other users can also acquire and use these user-defined parameters, when operating the App establishing platform. In this embodiment, there are two user-defined parameters, [data source] and [capturing interval], are filled into the field 750.

Figure 11:
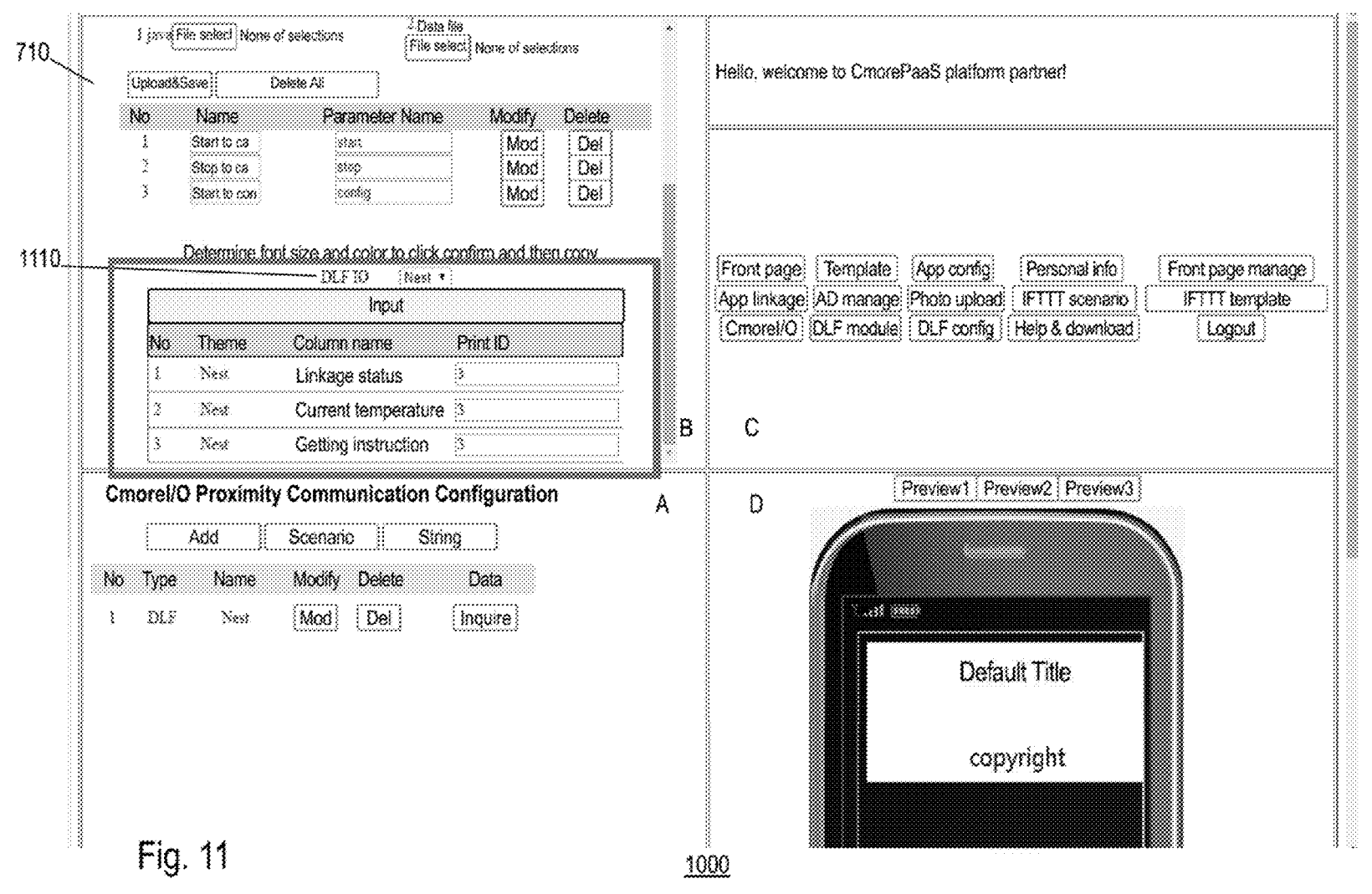

After the configuration to the I/O physical interface is finished, the entire I/O physical interface module is ready to be adopted into the DLF module. As shown in FIG. 11, a user selects an item "NEST" as the DLF 10 name in the DLF IO field 1110 in the instruction setting page 710, to load a corresponding I/O physical interface module and the parameter definition table thereof. The NEST I/O interface module defined earlier is selected in this embodiment. A confirmed button is clicked after the selection and the I/O interface module is linked into the DLF module.

Figure 12:
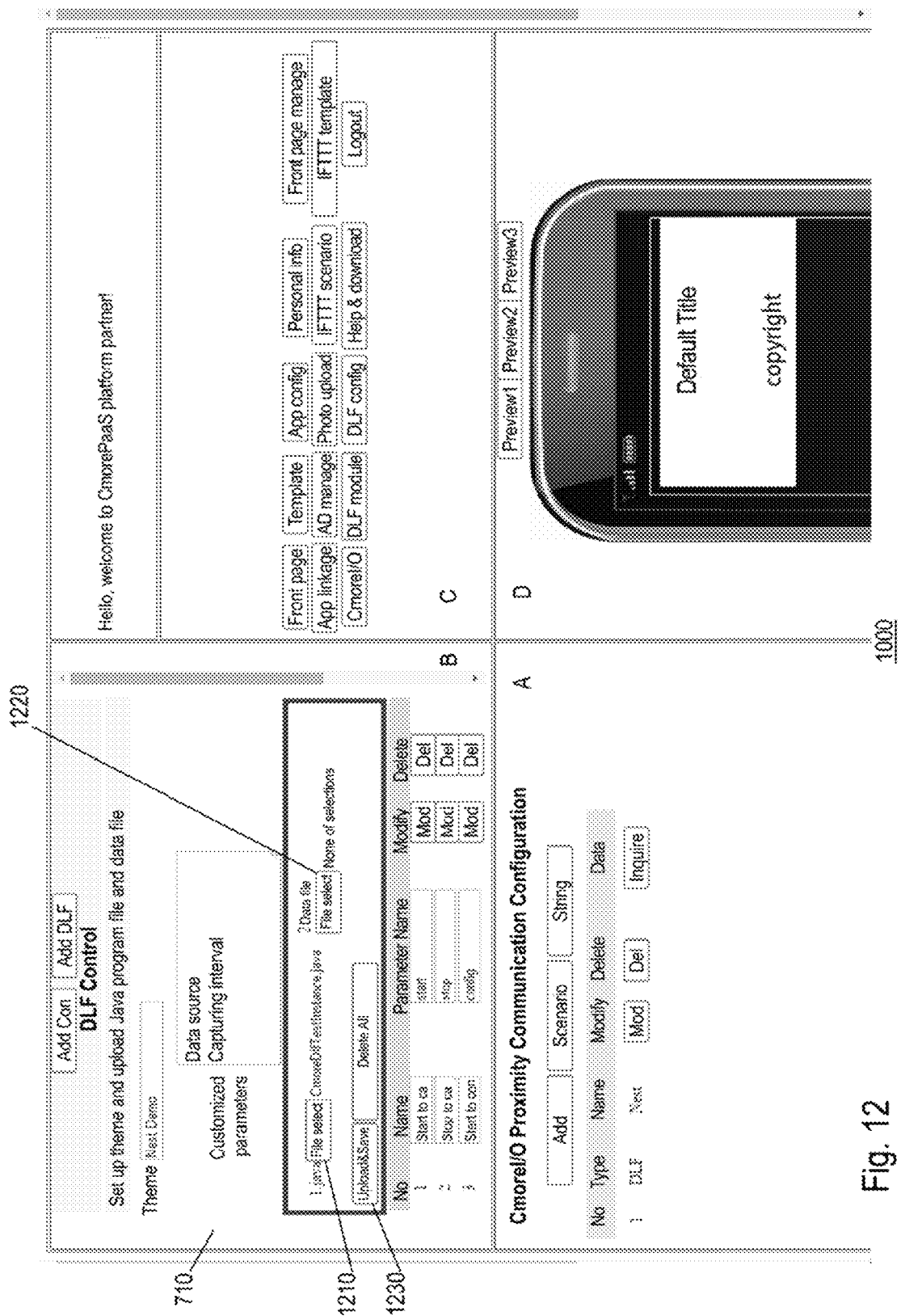
FIG. 12 shows a schematic diagram illustrating a DLF instruction setting page provided by the DLF App establishing platform in accordance with the present invention.

Next, a user has to upload the various files created during the provider project phase to the App establishing platform, which files include a main program CmoreDlfTestInstance.java programmed by Java language, CmoreDLF.jar and CmoreDNA.jar (if available). All files, parameters and data disclosable to the public and called by the main program CmoreDlfTestInstance.java are wrapped in the CmoreDNA.jar; however, the files, parameters and data belonging to the commercial secret are wrapped in the CmoreDNA.jar. The above-mentioned files are uploaded to the App establishing platform and ready to use. As shown in FIG. 12, a user clicks the file selection button 1210 close to the field title ".Java" in the instruction setting page 710 and then selects the file having the file name as CmoreDlfTestInstance.java, which is the main program coded with the DLF module. Then the file name CmoreDlfTestInstance.java is shown beside the file selection button 1210 which means the DLF module coded by Java language is selected. A user clicks the file selection button 1220 close to the field title "compressed file" in the instruction setting page 710 and then selects the files having file name as CmoreDLF.jar or CmoreDNA.jar (if available).

When the .Java file and a packet of relevant compressed files are selected, a user clicks the upload and save button 1230 to finish the process to upload the DLF module onto the App establishing platform. After this, the DLF module is currently available on the App establishing platform and accessible by all users. A user can select any DLF module available on the App platform and load it into the App under development. Thus a user can build, establish an App with more rich contents and diverse functions. Such an App establishing platform with the DLF function can realize the concept regarding linking every device by a mobile device. Currently, the DLF provider finishes all configurations during the provider platform phase and finishes the provider establishment stage. Next, the developer establishment stage is entered.

After every provider accomplishes the above-mentioned provider establishment stage, that is to upload its own DLF module onto the App platform, a DLF collection is thereby formed on the App establishing platform as a matter of course. Any App developer can select, call, load and employ these DLF modules on the App establishing platform. By performing certain simple configurations, a user can concatenate the selected DLF module into the App under development.

Figure 13:
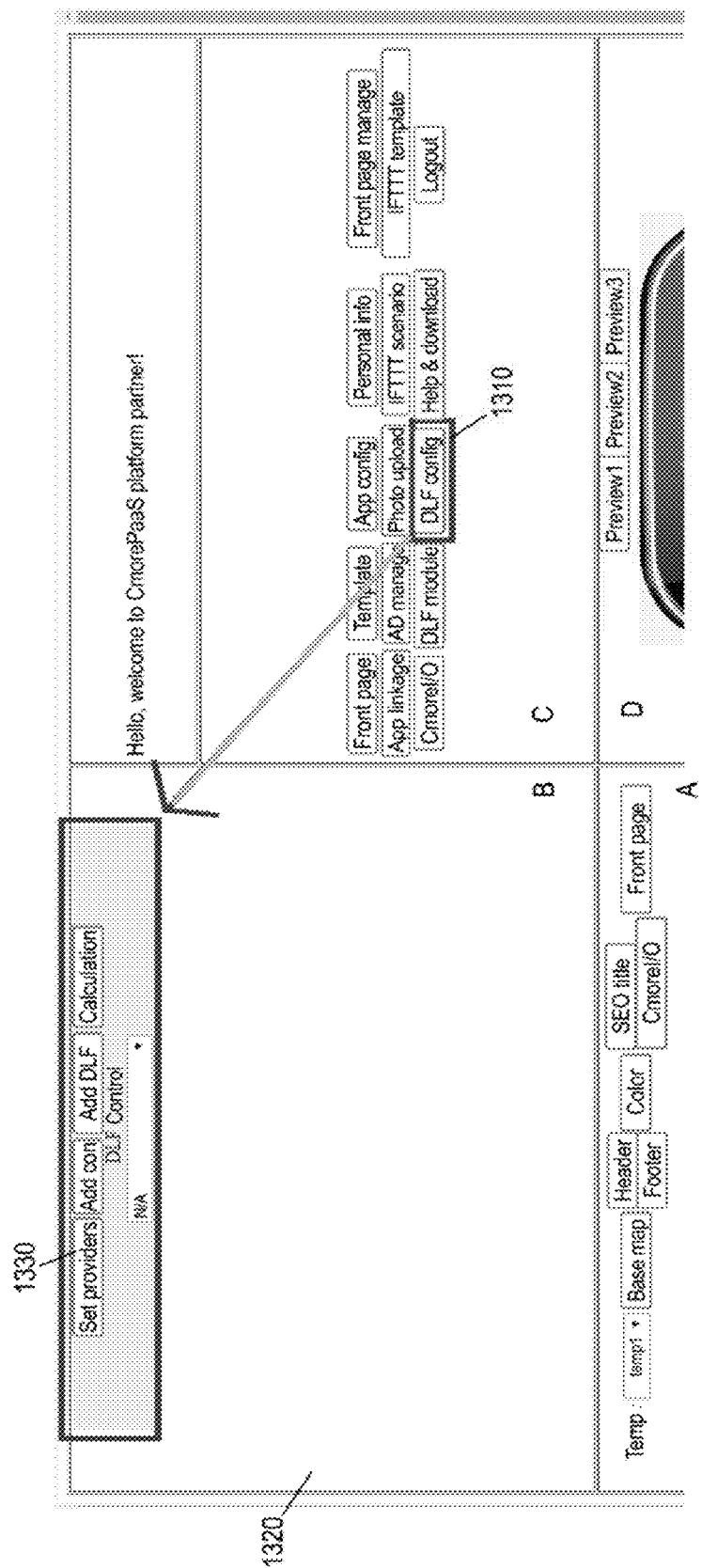
FIG. 13 shows a schematic diagram illustrating a DLF instruction setting page provided by the DLF App establishing platform in accordance with the present invention.
Figure 14:
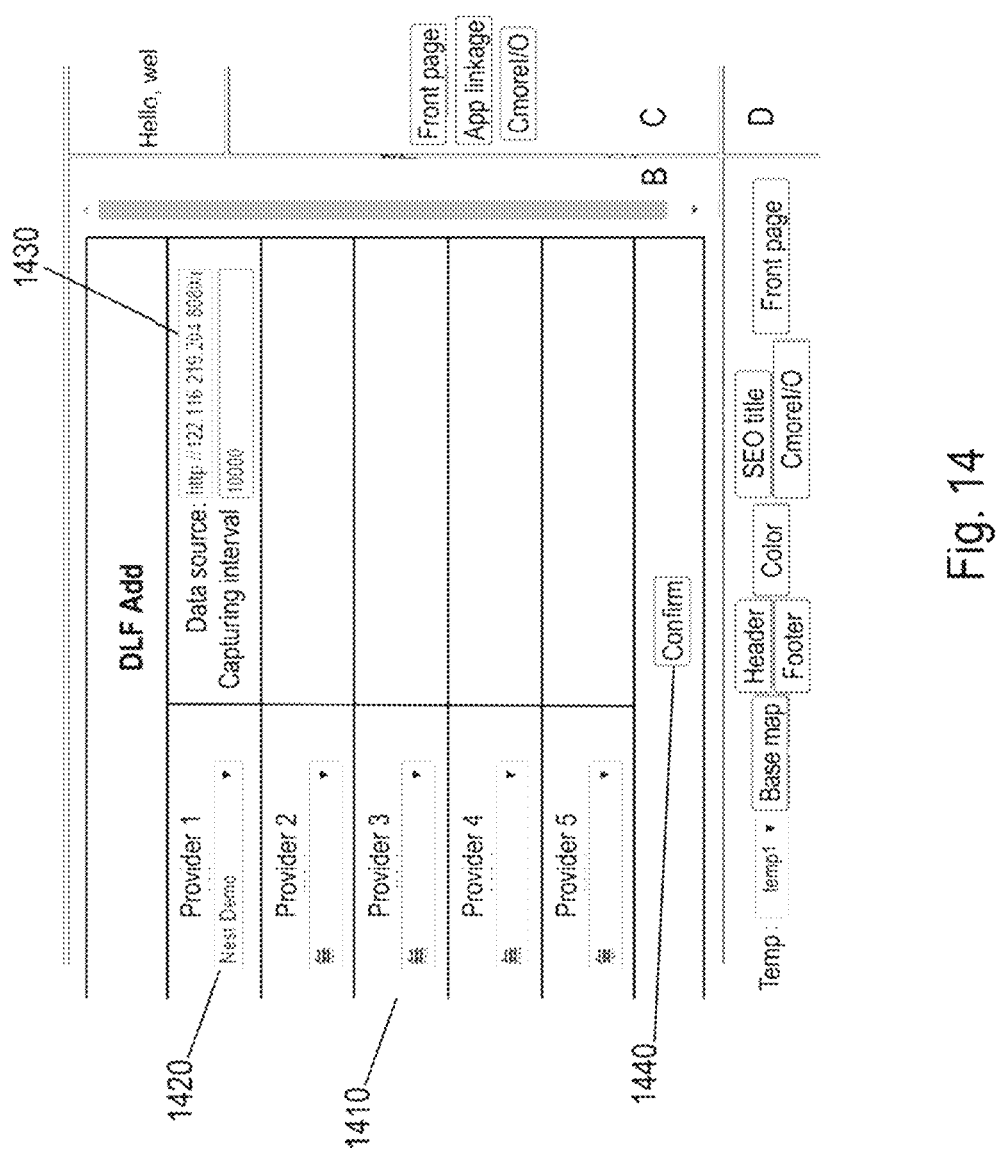

Work flows that a user (an App developer) couples the DLF into an App under development and sets it up are described as follows. The coupled NEST DLF module that is previously described acts as an example. As shown in FIG. 13, a user logins the App platform and enters the main UI 1000. A user selects and clicks the DLF conf button 1310 in option section C and a DLF control page 1320 is then shown in working section B. A user clicks the first five providers button 1330 in the DLF control page 1320. As shown in FIG. 14, the contents shown in working section B is switched to the adding DLF control page 1410. A user then performs a series of configurations by the adding DLF control page 1410.

First a user selects a provider and a specific DLF module provided by the provider through the pull-down menu in the provider field 1420 in the adding DLF control page 1410. A provider NEST Demo is selected in this embodiment. After the provider is selected, a user autonomously fills in parameters, including a data sourced URL address and a capturing interval, in the parameter input field 1430. Once the parameters are entered, a user clicks the confirmed button 1440 to save the configurations. Next the contents shown in working section A and working section B is switched back to the initial state, that is the option management page 210 is shown in the working section A and the trade mark is shown in working section B.

Figure 15:
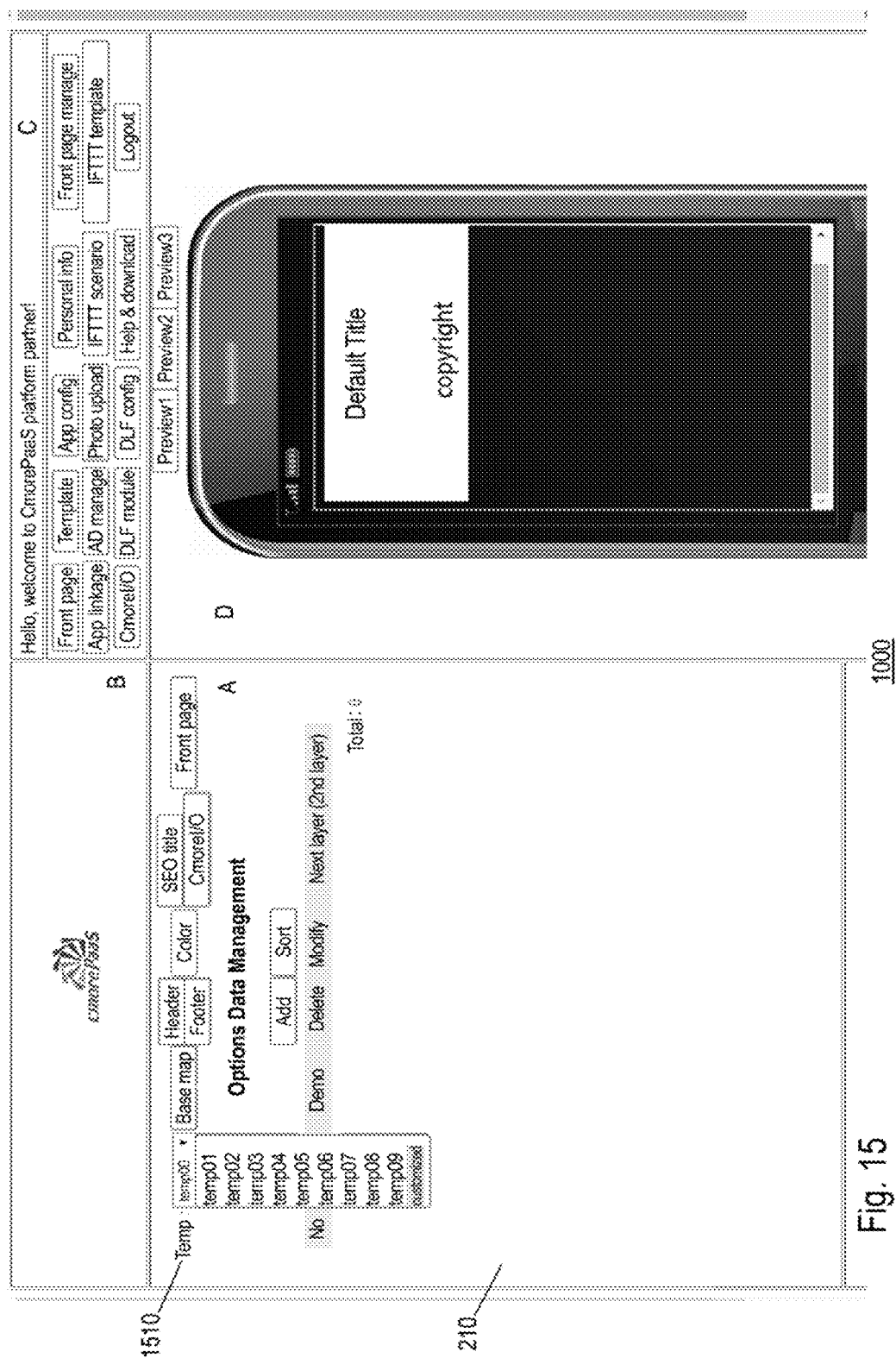
FIG. 15 shows a schematic diagram illustrating a main user interface provided by the DLF App establishing platform in accordance with the present invention.
Figure 16:
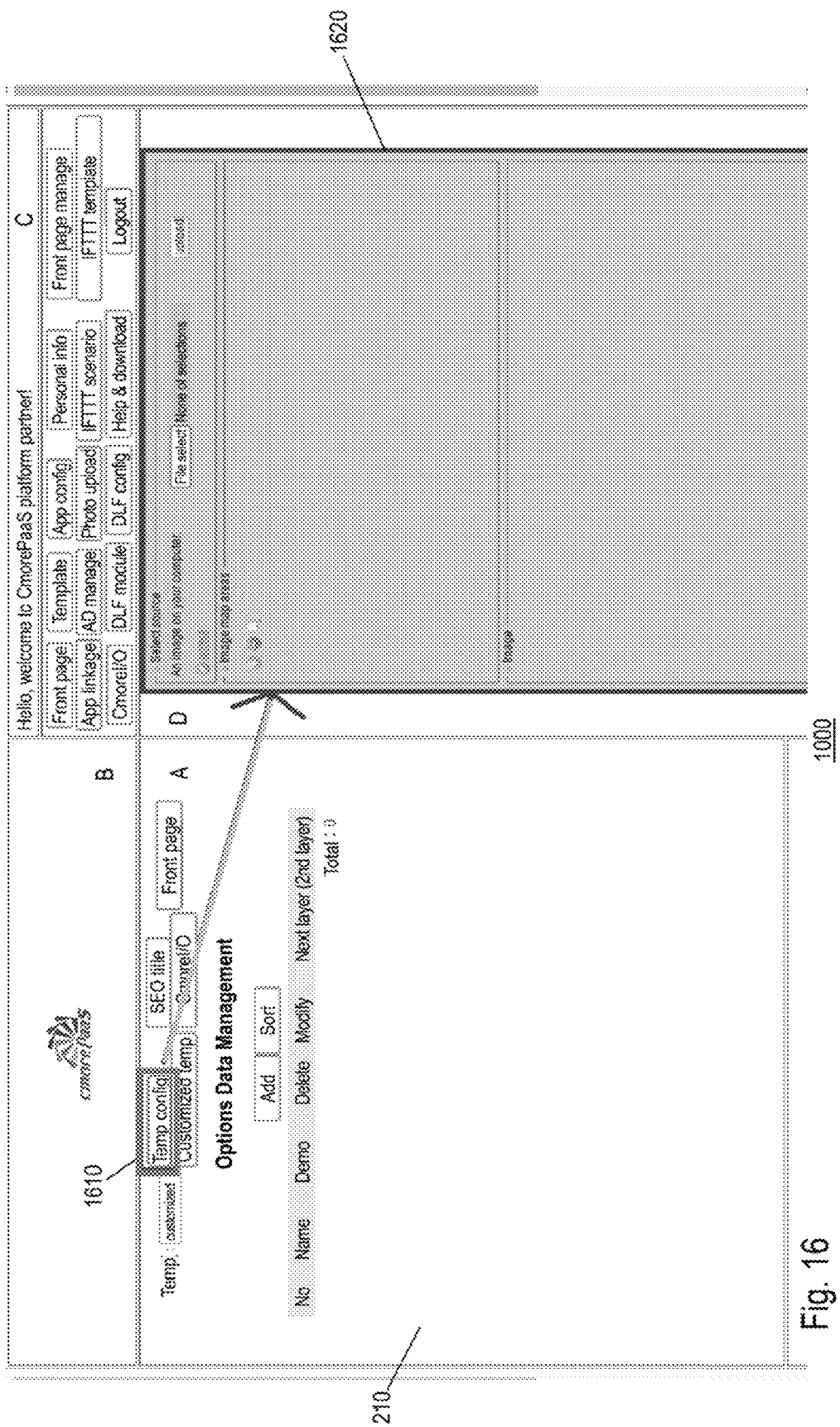
FIG. 16 shows a schematic diagram illustrating a customized template configuration page provided by the DLF App establishing platform in accordance with the present invention.

As shown in FIG. 15, a user gets started to configure the template the DLF module wants to show on the screen of the mobile phone. A user can set up the template by directly operating the App establishing platform. A template type is first selected. In this embodiment, a user selects the option customized temp in the pull-down menu in the template type field 1510. As shown in FIG. 16, the option management page 210 is then shown in working section A and a user clicks the for customized temp button 1610. The corresponding customized template configuration page 1620 is shown in the simulation section D. By operating the customized template configuration page 1620, a user can set up the template going to show on the screen of the mobile phone.

Figure 17:
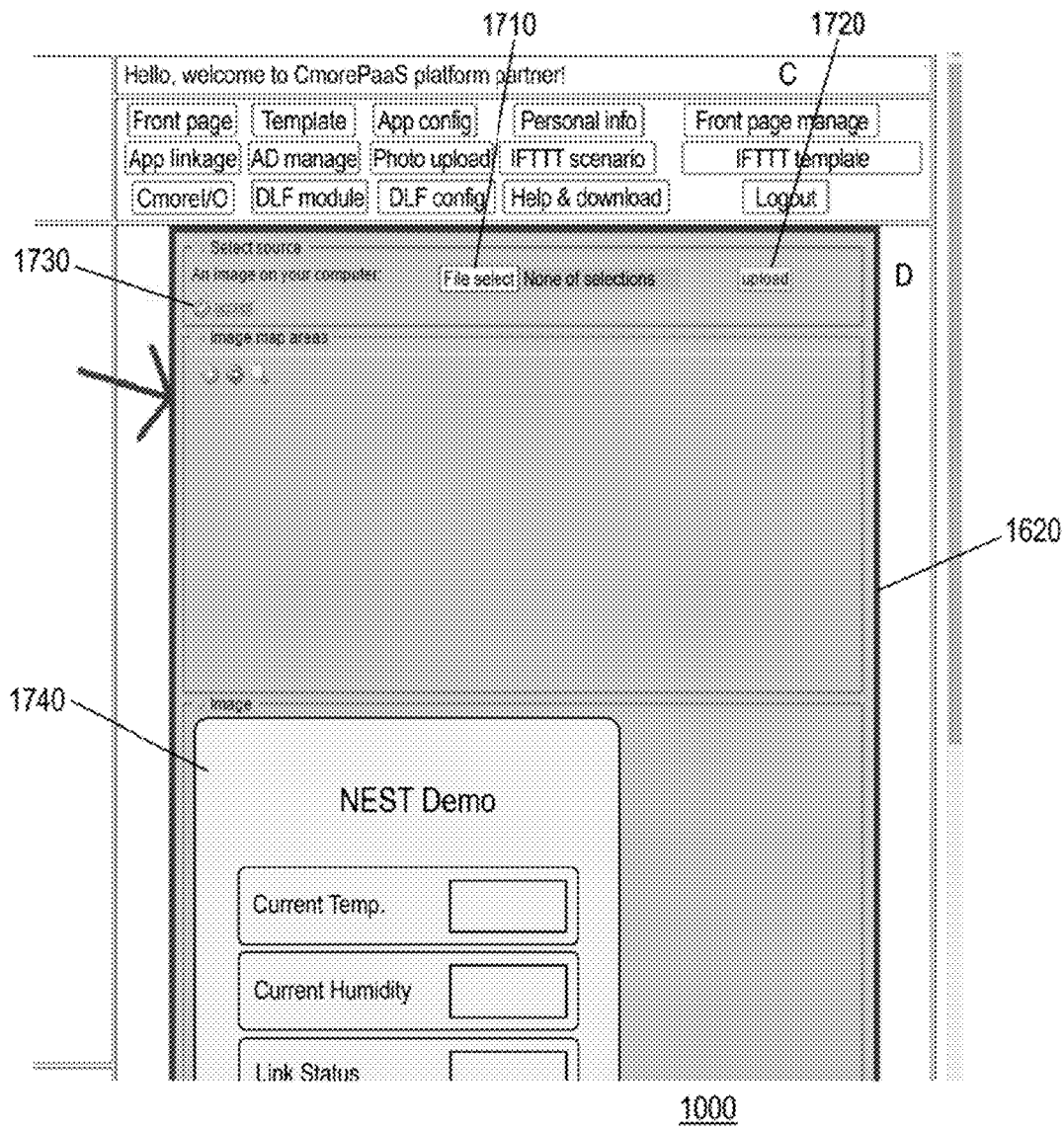
FIG. 17 shows a schematic diagram illustrating a customized template configuration page provided by the DLF App establishing platform in accordance with the present invention.

As shown in FIG. 17, a user first uploads a pre-made image file which is used as a desktop image for App. A user clicks the file selection button 1710 in the customized template configuration page 1620, selects the image file intended to upload, then clicks the upload button 1720 and finally clicks the accept button 1730. The image file acting as the App desktop image 1750 is currently uploaded to the customized template configuration page 1620 and shown in the image field 1740.

Figure 18:
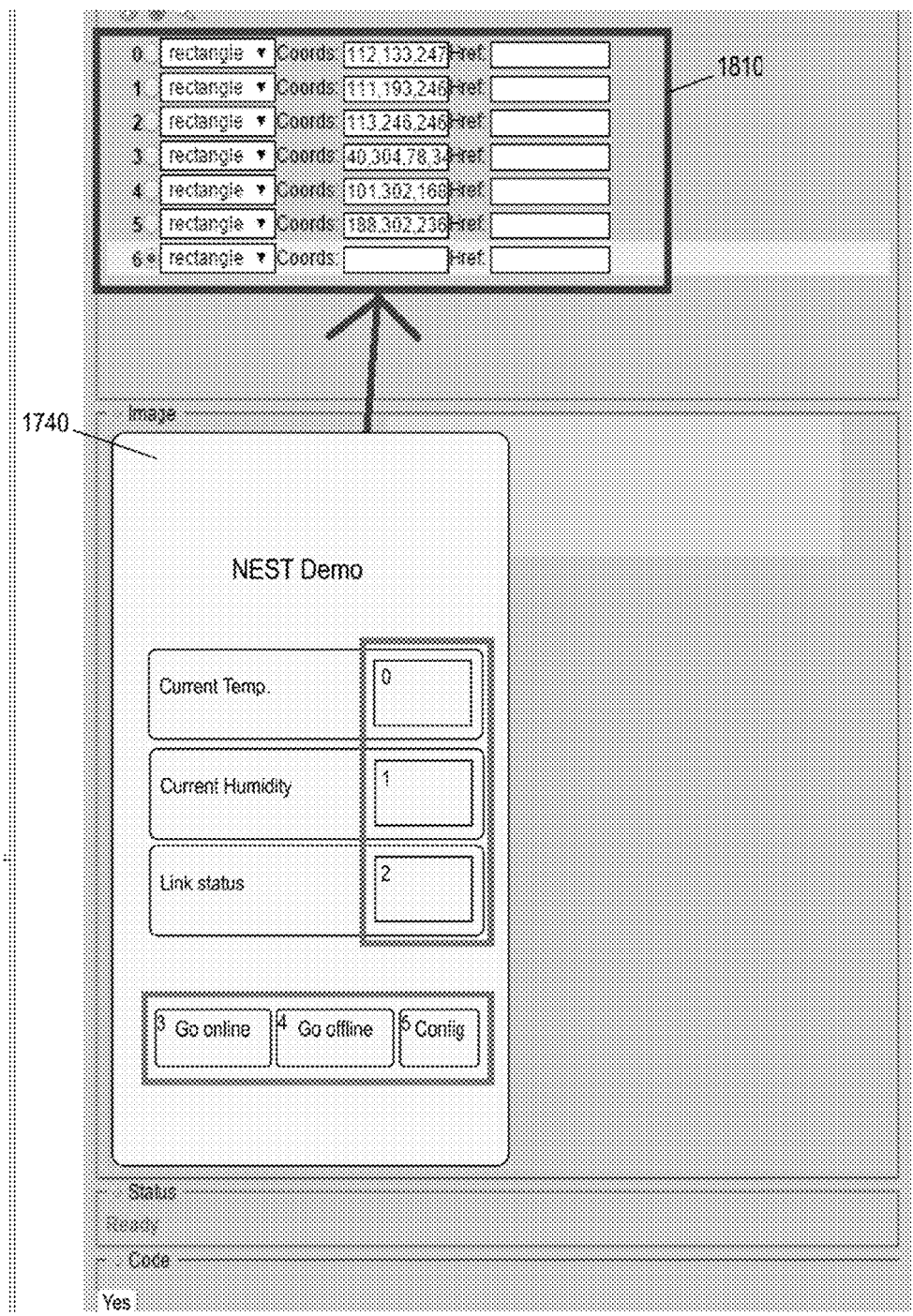
FIG. 18 shows a schematic diagram illustrating a customized template configuration page provided by the DLF App establishing platform in accordance with the present invention.

As shown in FIG. 18, a user further defines multiple operating blocks on the App desktop image 1750. A user presses and holds the left button on mouse and drags the mouse cursor to a certain position on the App desktop image 1750, then releases the left button to mark up and select an operating block on the App desktop image 1750 in image field 1740 and in the customized template configuration page 1620. The coordinates of four corners on the selected operating block is correspondingly shown in the image map area 1810 in the customized template configuration page 1620. Every operating block is given a number by sequence. By continuing to repeat the above-mentioned operations, a user can mark up and select multiple operating blocks. Corner coordinates for every block are shown in the image map area 1810.

In this embodiment, a user first marks up and selects an area close to the right hand side of the current temperature and the selected area is given a block number as 0 in the image map area 1810 and more information regarding four corner coordinates and the shape type (rectangular) for the selected area is correspondingly shown in the image map area 1810. Next, a user marks up and selects more operating blocks for the current humidity, the online state, the linkage, the end of the linkage and the configuration respectively. Every operating block is given block numbers as 1, 2, 3, 4, 5 . . . in sequence and the corner coordinates and the shape type thereof are correspondingly shown in the image map area 1810. Later on, a user can fill in a specific instruction in the Href field following the cords field in the image map area 1810 corresponding to a operating block to render the operating block to associate with the specific instruction and enable the operating block to accept the specific instruction and to has the corresponding operative function.

Figure 19:
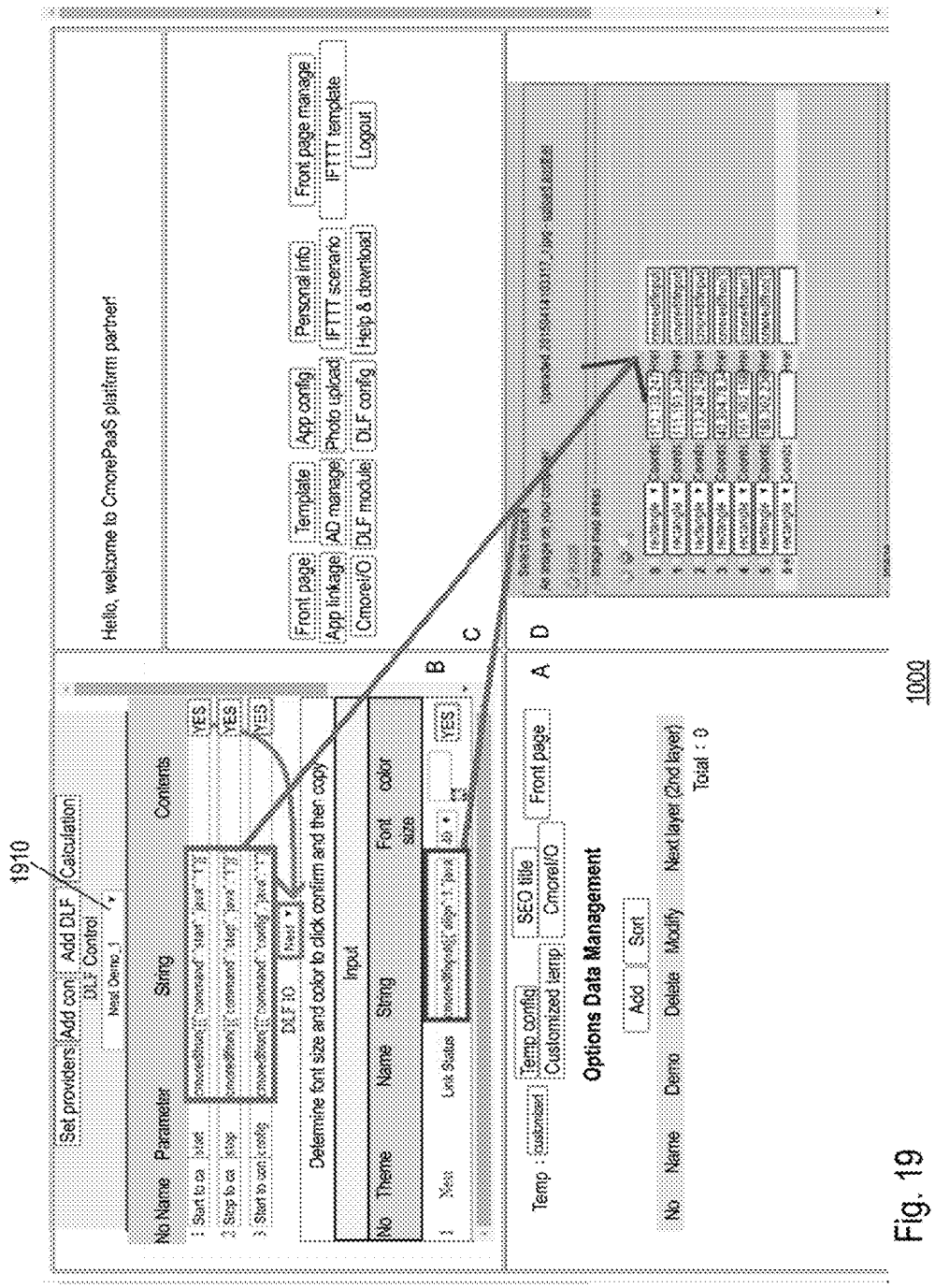
FIG. 19 shows a schematic diagram illustrating a DLF instruction setting page provided by the DLF App establishing platform in accordance with the present invention.
Figure 20:
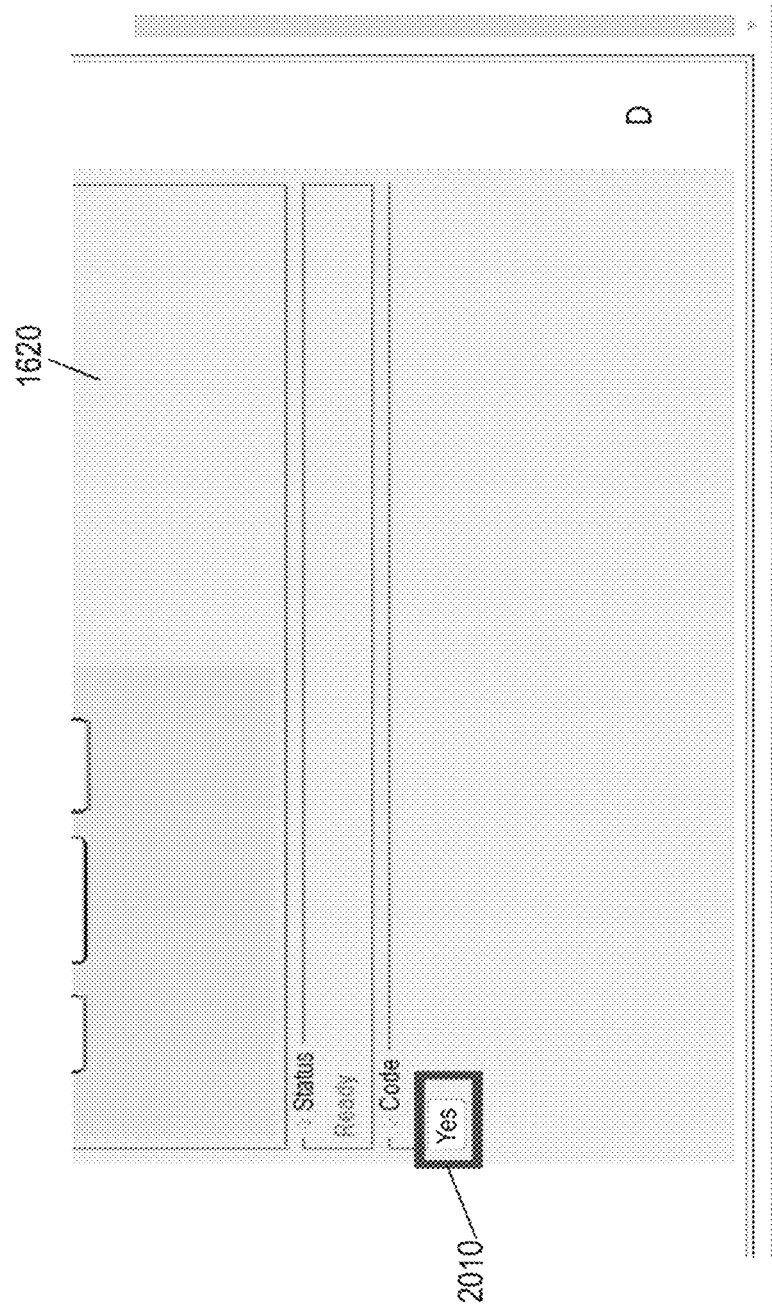
FIG. 20 shows a schematic diagram illustrating a customized template configuration page provided by the DLF App establishing platform in accordance with the present invention.

As shown in FIG. 19, a user returns back to the option section C to click the DLF conf button 1310. The instruction setting page 710 is again shown in the working section B. A user selects the item "NESTDemo_1" from the pull-down menu in the DLF control field 1910, and selects the item "NEST" from the pull-down menu in the DLF IO name field 1110 in the working section B. The instructions built earlier, including [getting started to capture; start], [cease capturing; stop] and [open the configuration window; config], etc., are shown in the instruction setting page 710. In the every field filled in with these instructions includes complete information associated with the corresponding instruction regarding the instruction number, the instruction name, the control parameter, the instruction character string, etc. A user can copy the entire information for a specific instruction in the working section B and paste it the Href field for a specific operating block in the image map area 1810 in the simulation section D, to render the specific instruction to be associated with the specific operating block, so that the specific operating block is set to accept the corresponding instruction. Repeating the above-mentioned steps, it is able to render every operating block to associate with a specific instruction. As shown in FIG. 20, once all operating blocks are associated with a specific instruction, a user clicks the confirmed button 2010 at the bottom side in the customized template configuration page 1620 in the simulation section D. The configuration assigning the instruction to every operating blocks is accomplished.

Figure 21:
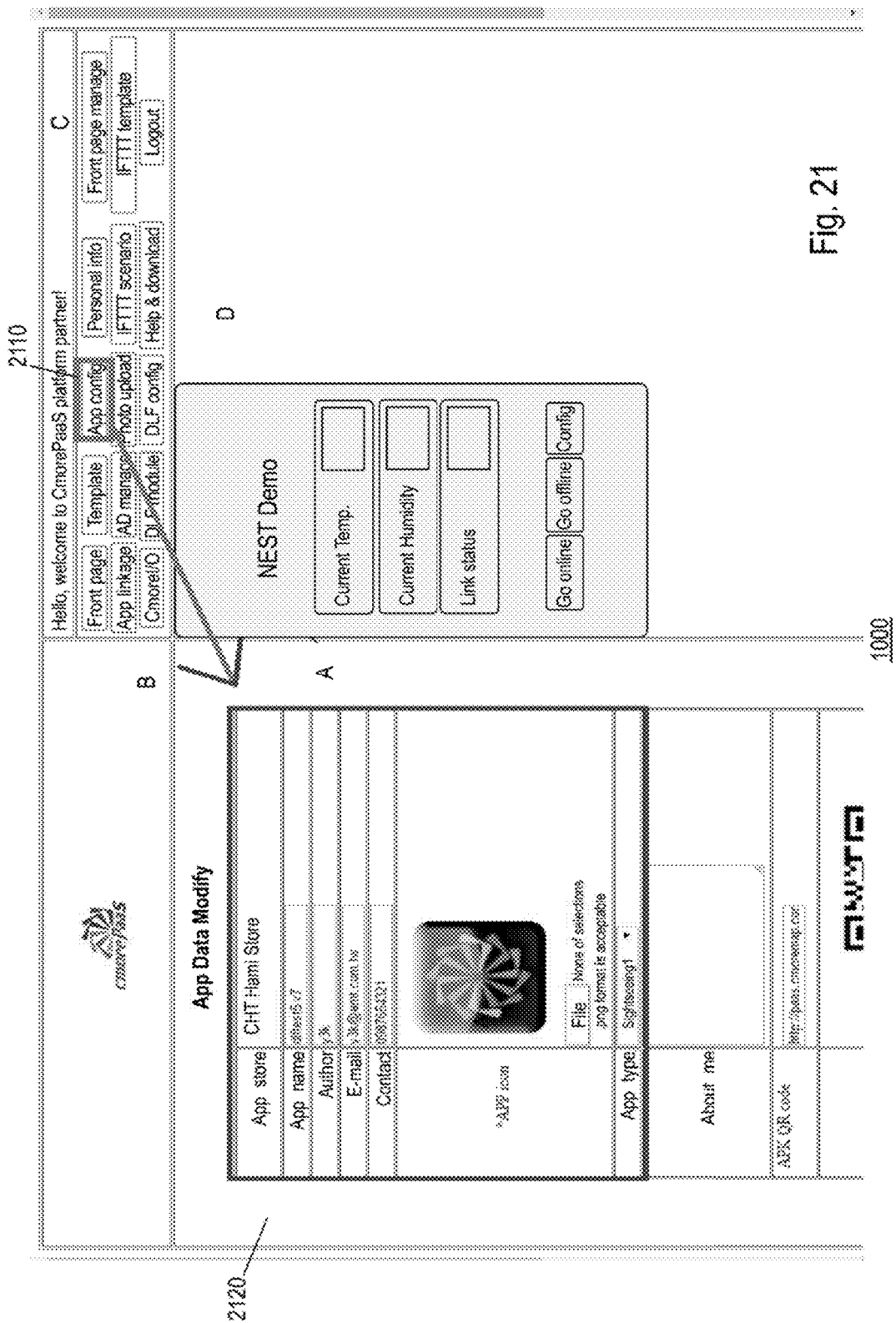
FIG. 21 shows a schematic diagram illustrating an App data modification page provided by the DLF App establishing platform in accordance with the present invention.
Figure 22:
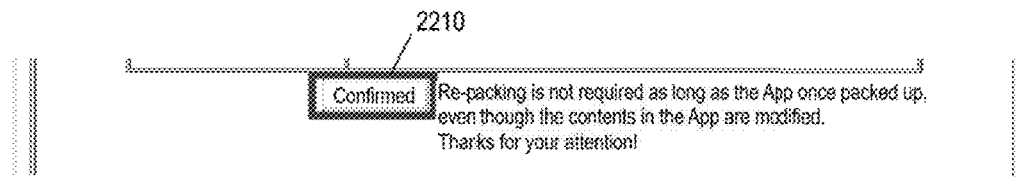
FIG. 22 shows a schematic diagram illustrating an App data modification page provided by the DLF App establishing platform in accordance with the present invention.
Figure 23:
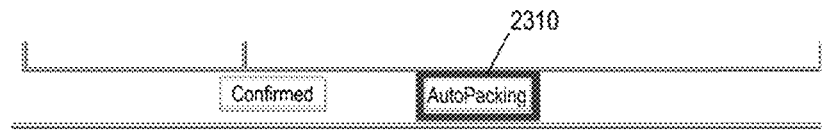
FIG. 23 shows a schematic diagram illustrating an App data modification page provided by the DLF App establishing platform in accordance with the present invention.
Figure 24:
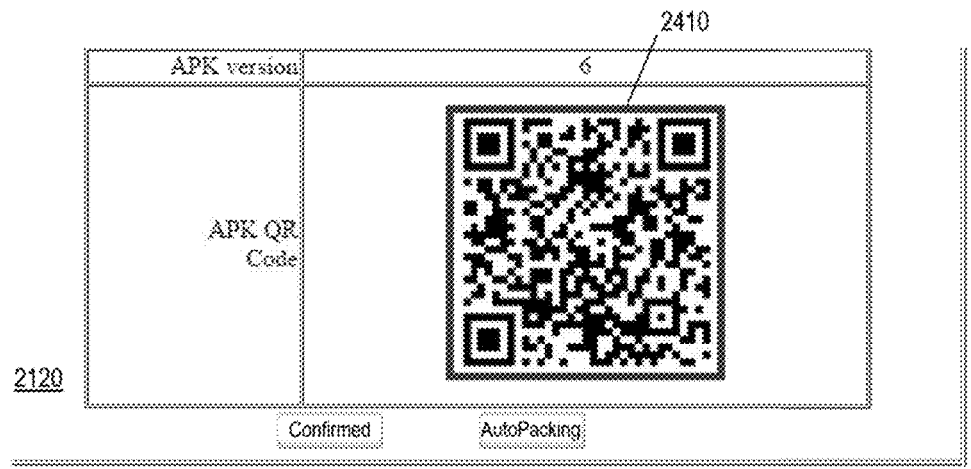
FIG. 24 shows a schematic diagram illustrating an App data modification page provided by the DLF App establishing platform in accordance with the present invention.

So far, a user (an App developer) already finishes most major establishing steps to link DLF module into the App under development. Finally, when a user accomplishes all the establishments for the App under development, as shown in FIG. 21, a user gets started to pack up and compile the App contents into an executable file by clicking the App conf button 2110 in the option section C. After a user clicks the App conf button 2110, an App data modification page 2120 is correspondingly shown in working section A. A user fills out the required information into the corresponding field on the App data modification page 2120. Once finished, a user clicks the confirmed button 2210 at the bottom side in the App data modification page 2120. Then as shown in FIG. 23, a user clicks the auto packing button 2310 at the bottom side in the App data modification page 2120, to activate the compilation process to compile the configured App contents into an executable App, for instance, an .apk file which is executable in an Android system. After the compilation, as shown in FIG. 24, a square QR code icon 2410 is accordingly generated in the App data modification page 2120.

Figure 25:
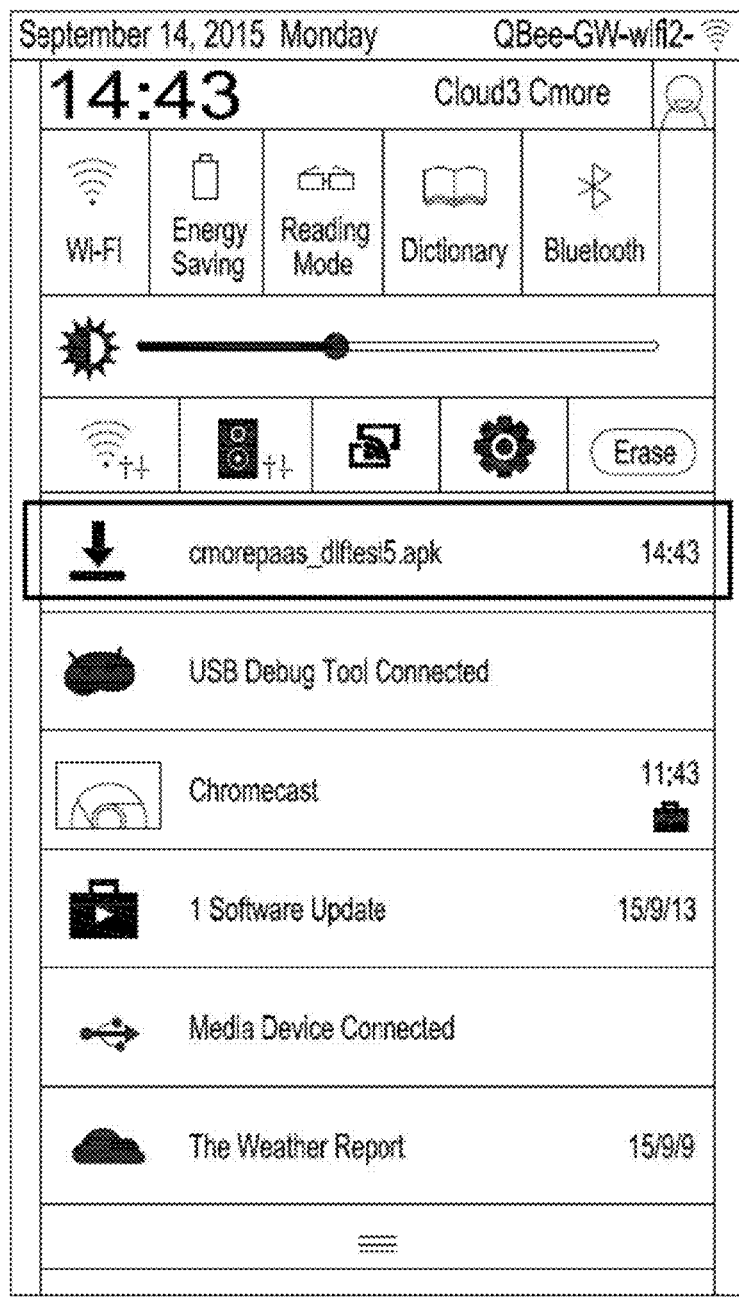
FIG. 25 shows a screen on a mobile device during downloading the finished DLF App established by the DLF App establishing platform in accordance with the present invention.
Figure 26:
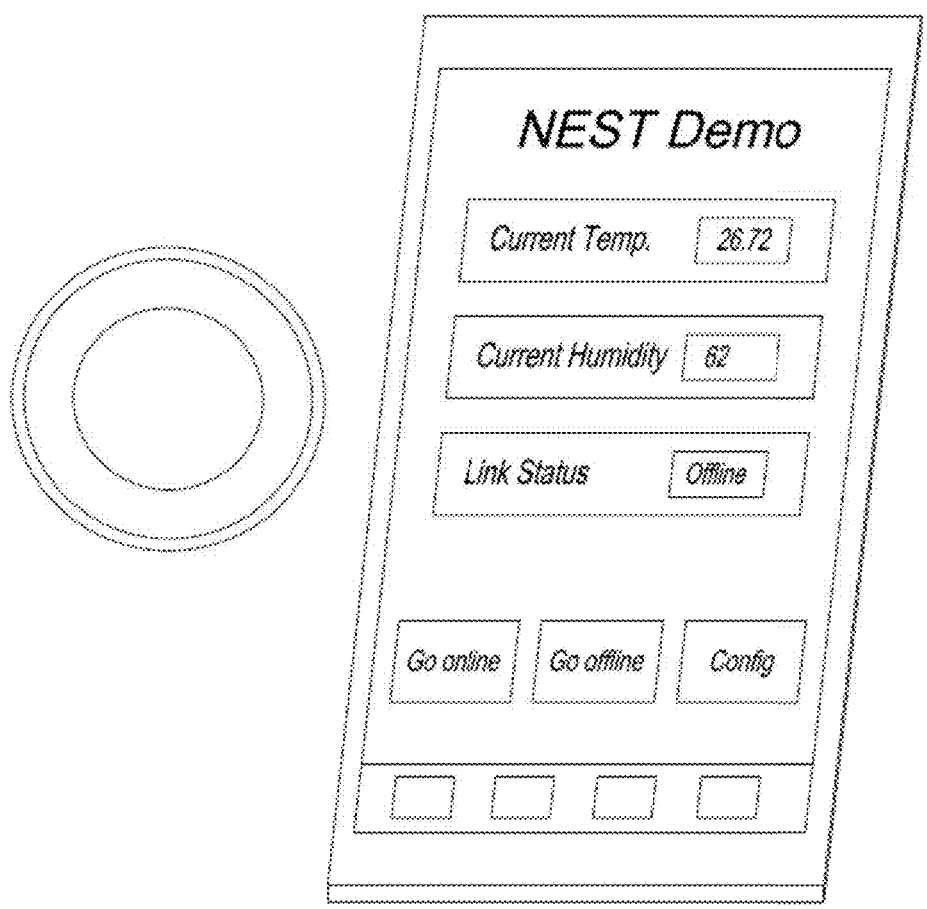
FIG. 26 shows a screen demonstrating the DLF App front page established by the DLF App establishing platform in accordance with the present invention.

As shown in FIG. 25, as long as a user (App developer) publishes this QR code icon 2410, any App user can download, install and execute the corresponding .apk file on one's own smart phone by simply scanning this QR code icon 2410 using the smart phone. As shown in FIG. 26, after the App is actually executed in the smart phone, the previously designed templates, instructions, functions and linked DLF modules are shown in the App on the screen and ready to operate. So far, a user accomplishes the establishment regarding an App that is able to call and load a DLF module during the execution on the mobile device.

Figure 27A:
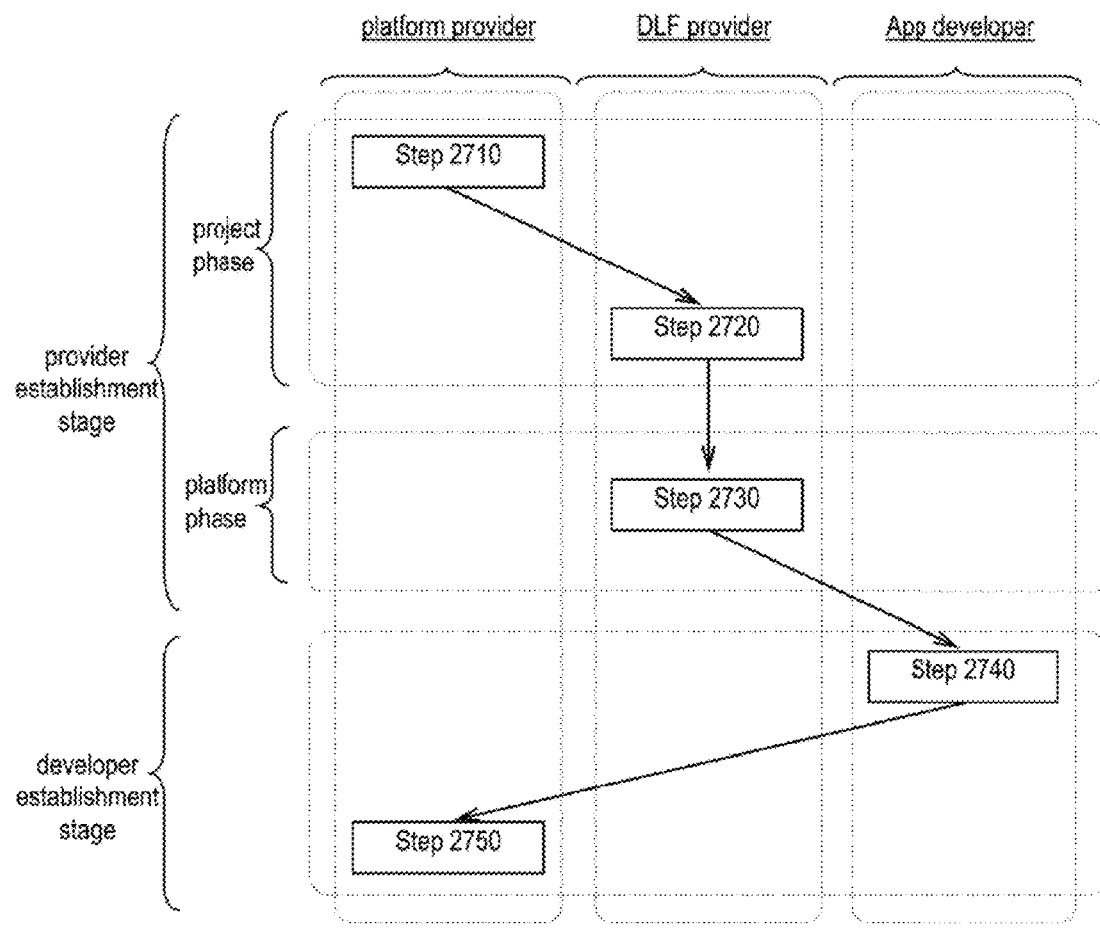
FIG. 27a shows a flow chart illustrating multiple steps included in the method establishing the DLF based App for a mobile device in accordance with the present invention.
Figure 27B:
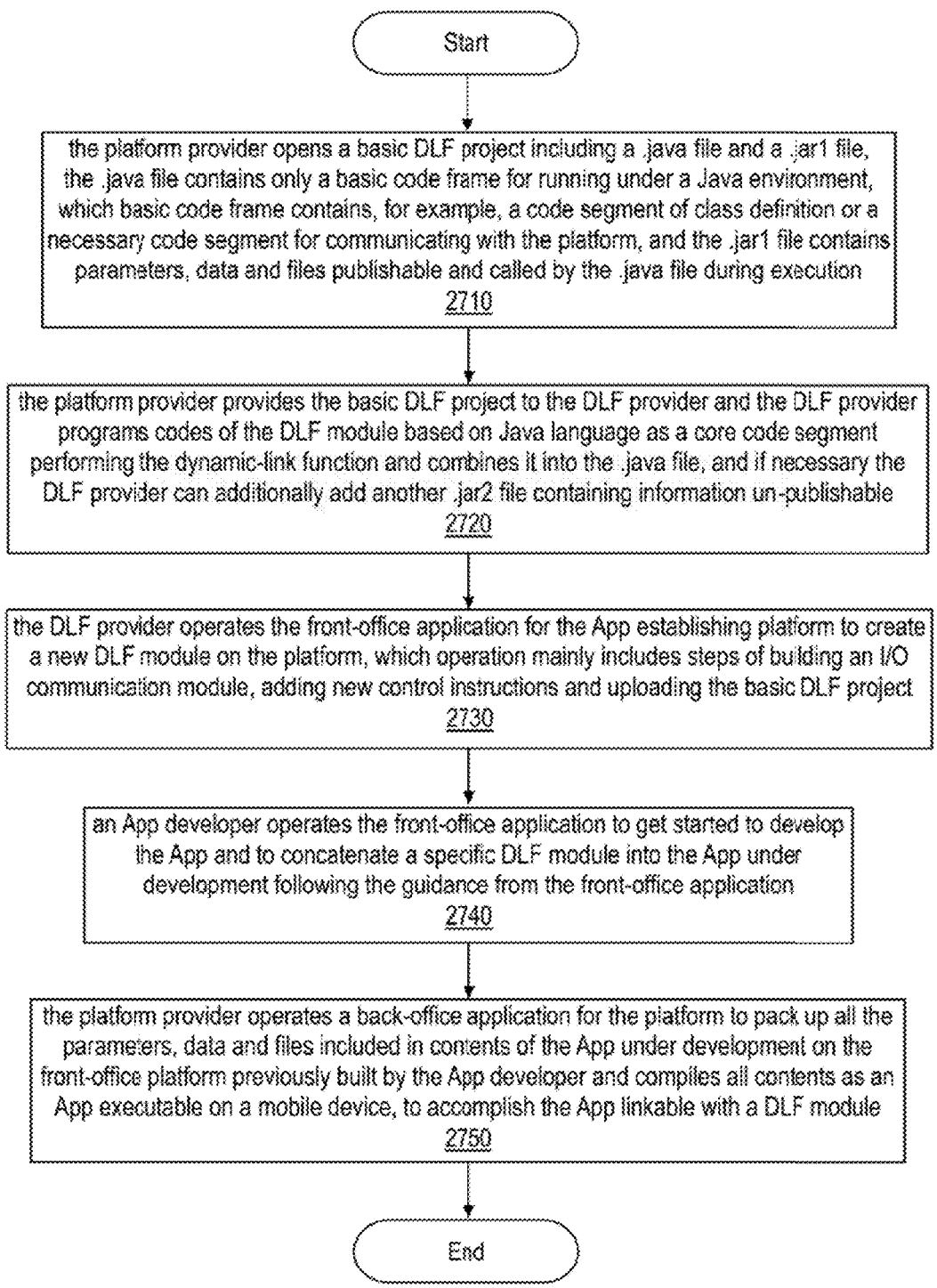
FIG. 27b shows a flow chart illustrating multiple steps included in the method establishing the DLF based App for a mobile device in accordance with the present invention.

FIGS. 27a and 27b show a flow chart illustrating multiple steps included in the method establishing the DLF based App for a mobile device in accordance with the present invention. To sum up the above-mentioned method, an establishing method to build a DLF based App for a mobile device is disclosed in the present invention, in particular to the establishing method to allow any App developer to link a DLF module in the App under development. As shown in FIG. 27a, there are totally three parties involved in during the process establishing the DLF based App as follows: a platform provider who provides the App establishing platform (termed as a platform provider for short), a DLF contents provider who provides the DLF module and uploads it onto the platform and can be a manufacturer to the DLF related software or hardware (termed as a DLF provider for short), and an App developer who builds and develops the App. The App establishing process includes two major stages which are a provider establishment stage and a developer establishment stage, wherein the provider establishment stage further includes two major phases which are a provider project phase and a provider platform phase.

As shown in FIG. 27b, in the step 2710, the platform provider opens a basic DLF project including a .java file and a .jar1 file, the .java file contains only a basic code frame for running under a Java environment, which basic code frame contains, for example, a code segment of class definition or a necessary code segment for communicating with the platform, and the .jar1 file contains parameters, data and files publishable and called by the .java file during execution. In the step 2720, the platform provider provides the basic DLF project to the DLF provider and the DLF provider programs codes of the DLF library based on Java language as a core code segment performing the dynamic-link function and combines it into the .java file, and if necessary the DLF provider can additionally add another .jar2 file containing information un-publishable.

In the step 2730, the DLF provider operates the front-office application for the App establishing platform to create a new DLF module on the platform, which operation mainly includes steps of building an I/O communication module, adding new control instructions and uploading the basic DLF project. In the step 2740, an App developer operates the front-office application to get started to develop the App and to concatenate a specific DLF module into the App under development following the guidance from the front-office application. In the step 2750, the platform provider operates a back-office application for the platform to pack up all the parameters, data and files included in contents of the App under development on the front-office platform previously built by the App developer and compiles all contents as an App executable on a mobile device, to accomplish the App linkable with a DLF module.

There are further embodiments provided as follows.

Embodiment 1: A system of establishing an application program for a mobile device by providing a user to autonomously establish the application program, which has a capability of dynamically calling and loading a dynamic link function (DLF) library during execution, through operating on an internet browser showing a user interface provided by an application program establishing platform, includes: a server in a remote end and installed with the platform, which platform comprises a DLF module shown by the user interface and configured to provide the user to set in the application program a call and a loader associated to the DLF library during the establishing process; and a personal computer in a local end, connected with the server through an Internet and installed with the internet browser, wherein the user accesses to the platform to operate the DLF module to establish the application program through operating on the internet browser showing the user interface.

Embodiment 2: The system according to Embodiment 1, the DLF module is provided and created on the platform by a DLF provider, and the DLF provider creates the DLF module through operating on the internet browser showing the user interface and opens and launches the DLF module created on the platform to all users for use and operation.

Embodiment 3: The system according to Embodiment 1, the personal computer is one selected from a desktop computer, a notebook computer and a tablet computer and the mobile device is one selected from a smart phone, a tablet computer, a phablet and a wearable device.

Embodiment 4: The system according to Embodiment 1, the internet is one selected from a cable network, a wireless network, a cloud network, a local area network (LAN) or a wide area network (WAN), a GSM network, a 3G network, a 4G network, a Wi-Fi network and a combination thereof.

Embodiment 5: The system according to Embodiment 1, the user is one of an application program developer and a DLF provider.

Embodiment 6: A method of establishing an application program for a mobile device by providing a user to autonomously establish the application program, which has a capability of dynamically calling and loading a dynamic link function (DLF) library during execution, through operating on an internet browser showing a user interface provided by an application program establishing platform, includes: in a remote end providing the platform comprising a DLF module shown by the user interface and configured to provide the user to set in the application program a linkage and a loader to the DLF library during the establishing process; and in a local end accessing to the platform to operate the DLF module to establish the application program through operating on the internet browser showing the user interface.

Embodiment 7: The method according to Embodiment 6, further includes one of the following steps: providing the platform by a platform provider; providing the DLF module by a DLF provider; by the platform provider creating and providing a DLF project comprising a program file and a first data file to the DLF provider, wherein the program file comprises a basic code frame having a basic code segment for communicating with the platform and the first data file comprises parameters, data and files called and employed by the basic code frame during execution; by the DLF provider receiving the DLF project, programming a core code segment for performing a function for the DLF library, and saving the parameters, data and files called and employed by the core code segment into the first data file; by the DLF provider operating the platform by operating on the internet browser showing the user interface to create the DLF module on the platform by following with a guidance from the platform and uploading the program file and the first data file to the DLF module by following with the guidance; by the user operating the DLF module on the platform by operating on the internet browser showing the user interface to set the linkage and the loader to the DLF library in the application program to establish the application program by following with the guidance; and by the platform provider compiling and packing the established application program into an executive program executable on the mobile device.

Embodiment 8: The method according to Embodiment 7, further includes one of the following steps: by the DLF provider creating a second data file saving un-publishable parameters, data and files called and employed by the basic core code segment and the core code segment.

Embodiment 9: A platform of establishing an application program for a mobile device providing a user to autonomously establish the application program having a capability of dynamically calling and loading a dynamic link function (DLF) library during execution, includes: a user interface shown by an internet browser; and a DLF module shown by the user interface and configured to provide the user to set in the application program a call and a linkage to the DLF library during the establishing process, wherein a user accesses to the platform to operate the DLF module to establish the application program through operating on the internet browser showing the user interface.

Embodiment 10: The platform according to Embodiment 9, the DLF module is configured to have a menu based interface and a click based interface, so as to provide the user to operate the DLF module simply based on a selection based operation and a click based operation.

While the disclosure has been described in terms of what are presently considered to be the most practical and preferred embodiments, it is to be understood that the disclosure need not be limited to the disclosed embodiments. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present disclosure which is defined by the appended claims.

What is claimed is:

1. An application program establishing method for a mobile device by providing a user to autonomously establish the application program, which has a capability of dynamically calling and loading a compatible dynamic link function (DLF) library during execution, through operating on an internet browser showing a user interface provided by an application program establishing platform, comprising:

provided the application program establishing platform on a remote server, which the application program establishing platform comprises a DLF module shown by the user interface and is configured to provide the compatible DLF library for the user to use in and integrate into the application program during the establishing process; and accessing to the application program establishing platform through a local personal computer connected to the remote server via an Internet connection and containing the internet browser, to operate the DLF module to establish the application program and to select the compatible DLF library to use during the establishing process through operating via the internet browser showing the user interface, wherein the DLF module allows a hardware vendor to upload an original DLF library including a required protocol information for controlling an external device, transforms the original DLF library into the compatible DLF library including the required protocol information for controlling the external device, and publishes the compatible DLF library on the application program establishing platform available for the user to use during the establishing process, and the application program integrated with the compatible DLF library and running on a mobile device is particularly used for remotely controlling the external device from the mobile device.

2. The method according to claim 1, further comprising one of the following steps:

providing the platform by a platform provider;
providing the DLF module by a DLF provider;
by the platform provider creating and providing a DLF project comprising a program file and a first data file to the DLF provider, wherein the program file comprises a basic code frame having a basic code segment for communicating with the platform and the first data file comprises parameters, data and files called and employed by the basic code frame during execution;
by the DLF provider receiving the DLF project, programming a core code segment for performing a function for the DLF library, and saving the parameters, data and files called and employed by the core code segment into the first data file;
by the DLF provider operating the platform by operating on the internet browser showing the user interface to create the DLF module on the platform by following with a guidance from the platform and uploading the program file and the first data file to the DLF module by following with the guidance;
by the user operating the DLF module on the platform by operating on the internet browser showing the user interface to set the linkage and the loader to the DLF library in the application program to establish the application program by following with the guidance; and by the platform provider compiling and packing the established application program into an executive program executable on the mobile device.

3. The method according to claim 2, further comprising one of the following steps:

by the DLF provider creating a second data file saving un-publishable parameters, data and files called and employed by the basic core code segment and the core code segment.

4. An application program establishing system for a mobile device by providing a user to autonomously establish an application program, which has a capability of dynamically calling and loading a compatible dynamic link function (DLF) library during execution, through operating on an internet browser showing a user interface provided by an application program establishing platform, comprising:

a remote server containing the application program establishing platform, wherein the application program establishing platform comprises a DLF module shown by the user interface and configured to provide the compatible DLF library for the user to use in and integrate into the application program during the establishing process; and a local personal computer, connected to the remote server via an Internet connection and containing the internet browser, wherein the user accesses to the application program establishing platform to operate the DLF module to establish the application program and to select the compatible DLF library to use during the establishing process through operating on the internet browser showing the user interface, wherein the DLF module allows a hardware vendor to upload an original DLF library including a required protocol information for controlling an external device, transforms the original DLF library into the compatible DLF library including the required protocol information for controlling the external device, and publishes the compatible DLF library on the application program establishing platform available for the user to use during the establishing process, and the application program integrated with the compatible DLF library and running on a mobile device is particularly used for remotely controlling the external device from the mobile device.

5. The system according to claim 4, wherein the DLF module is provided and created on the platform by a DLF provider, and the DLF provider creates the DLF module through operating on the internet browser showing the user interface and opens and launches the DLF module created on the platform to all users for use and operation.

6. The system according to claim 4, wherein the personal computer is one selected from a desktop computer, a notebook computer and a tablet computer and the mobile device is one selected from a smart phone, a tablet computer, a phablet and a wearable device.

7. The system according to claim 4, wherein the internet is one selected from a cable network, a wireless network, a cloud network, a local area network (LAN) or a wide area network (WAN), a GSM network, a 3G network, a 4G network, a Wi-Fi network and a combination thereof.

8. The system according to claim 4, wherein the user is one of an application program developer and a DLF provider.

* * * * *